US012215832B2

(12) United States Patent
Kang et al.

(10) Patent No.: US 12,215,832 B2
(45) **Date of Patent: *Feb. 4, 2025**

(54) LED LUMINANCE AND COLOR VISUALIZATION AND SPECIFICATION SYSTEM AND METHOD

(71) Applicant: Bitro Group, Inc., Hackensack, NJ (US)

(72) Inventors: Edmund C. Kang, Whitestone, NY (US); Ki S. Lee, Palisades Park, NJ (US)

(73) Assignee: Bitro Group, Inc., Hackensack, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,191

(22) Filed: Jan. 2, 2024

(65) Prior Publication Data

US 2024/0142068 A1 May 2, 2024

Related U.S. Application Data

(63) Continuation-in-part of application No. 17/863,959, filed on Jul. 13, 2022, now Pat. No. 11,873,983.

(Continued)

(51) Int. Cl.

*F21K 9/237* (2016.01)
*F21V 17/04* (2006.01)

(Continued)

(52) U.S. Cl.

CPC .............. *F21K 9/237* (2016.08); *F21V 17/04* (2013.01); *F21V 17/105* (2013.01);

(Continued)

(58) Field of Classification Search

CPC ................................. F21V 3/00; H05B 45/18

See application file for complete search history.

(56) References Cited

U.S. PATENT DOCUMENTS

| | | | | |
|---|---|---|---|---|
| 2018/0226014 | A1* | 8/2018 | Komanduri | H10K 50/85 |
| 2021/0298143 | A1* | 9/2021 | Zarcone | H05B 47/11 |

(Continued)

OTHER PUBLICATIONS

Non-final Office Action issued by the USPTO for U.S. Appl. No. 17/863,959, dated Feb. 16, 2023.

*Primary Examiner* — Christopher E Dunay

(74) *Attorney, Agent, or Firm* — Myers Wolin, LLC

(57) ABSTRACT

An LED specification system is provided having at least one LED light output device. The LED light output device has an LED light source, a first exchangeable face panel selectable from a plurality of potential exchangeable face panels, and a housing for locating the exchangeable face panel relative to the LED light source and for orienting the LED light source such that light from the LED light source passes through the first exchangeable face panel. The LED specification system further includes a user interface for selecting at least one preferred output characteristic for light from the LED light output device. The preferred output characteristic is defined by a metric value. The LED specification system further includes a transformation module for defining an LED specification value based at least partially on the defined metric value and a characteristic of the LED light source.

20 Claims, 33 Drawing Sheets
(14 of 33 Drawing Sheet(s) Filed in Color)

Related U.S. Application Data

(60) Provisional application No. 63/221,573, filed on Jul. 14, 2021.

(51) Int. Cl.

| | |
|---|---|
| ***F21V 17/10*** | (2006.01) |
| ***F21V 23/00*** | (2015.01) |
| *F21W 131/30* | (2006.01) |
| *F21Y 115/10* | (2016.01) |

(52) U.S. Cl.

CPC ....... *F21V 23/009* (2013.01); *F21W 2131/30* (2013.01); *F21Y 2115/10* (2016.08)

(56) References Cited

U.S. PATENT DOCUMENTS

| | | | | |
|---|---|---|---|---|
| 2022/0059049 | A1* | 2/2022 | Bird | G09G 3/006 |
| 2022/0104321 | A1* | 3/2022 | Sooch | H05B 47/16 |
| 2022/0343866 | A1* | 10/2022 | Suzuki | G09G 3/3611 |

* cited by examiner

| ZONE | ILLUMITONE NUMBER |
|---|---|
| 1 | ITS-IMH-IH02-X |
| 2 | ITS-IMH-W02-X |

FIG. 20C
FIG. 20D
Intermountain
Health
DAY
Intermountain
Health
NIGHT

| | | |
|---|---|---|
| 1 | **INTERMOUNTAIN HEALTH LOGO**<br>Lighting to brightly illuminate the logo and needs to be balanced with the white "Intermountain Health" wordmark | |
| V | Vinyl/Lamination | **1ST SURFACE:** Miratec, printed on 3M translucent film I3630-20, 3M 3660M overlaminate applied<br>**2ND SURFACE:** NONE |
| A | Diffusion Material | 2447, 3/16" |
| L | LED and Lighting | **6500K Bitro XPro Series** |
| I | Intensity | E13 **2000 cd/m²** |
| | Target Illumination Ratios Between Zones | Illuminated surface on 3M translucent film (I3630-20) without print should be about 65% brighter than the reference |
| | LED Population Notes | Modules to cover beyond letters up to full letter width/height for proper illumination |
| | Remarks | |

FIG. 21A

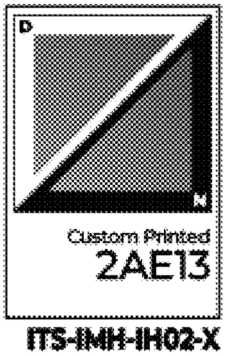

FIG. 21B

| | | |
|---|---|---|
| 2 | **WHITE BRANDING COPY**<br>Light levels on pylons with black day/night copy will be lower brightness target since illumating the black copy to match 4000 lux on white is very costly | |
| V | Vinyl/Lamination | **1ST SURFACE:**<br>NONE<br>**2ND SURFACE:**<br>NONE |
| A | Diffusion Material | 7328, 3/16" |
| L | LED and Lighting | **6500K Bitro XPro Series** |
| I | Intensity | E11 **1260 cd/m$^2$** |
| | Target Illumination Ratios Between Zones | Reference |
| | LED Population Notes | Modules to cover beyond letters up to full letter width/height for proper illumination |
| | Remarks | Target brightness is lower than other signs without day/night elements |

FIG. 22A

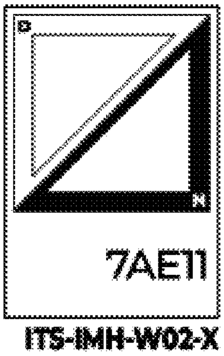

FIG. 22B

| ZONE | ILLUMITONE NUMBER |
|---|---|
| 1 | ITS-IMH-IH01-X |
| 2 | ITS-IMH-W01-X |
| 3 | ITS-IMH-WB01-X |
| 4 | ITS-IMH-UC01-X |
| 5 | ITS-IMH-EM01-X |

FIG. 23B

2 WHITE BRANDING COPY

Light levels on pylons with black day/night copy will be lower brightness target since illumating the black copy to match 4000 lux on white is very costly.

| | | |
|---|---|---|
| V | Vinyl/Lamination | **1ST SURFACE:** NONE **2ND SURFACE:** NONE |
| A | Diffusion Material | 7328, 3/16" |
| L | LED and Lighting | **6500K Bitro XPro Series** |
| I | Intensity | E9 **794 cd/m²** |
| | Target Illumination Ratios Between Zones | Reference |
| | LED Population Notes | Modules to cover beyond letters up to full letter width/height for proper illumination |
| | Remarks | Target brightness is lower than other signs without day/night elements |

FIG. 25A

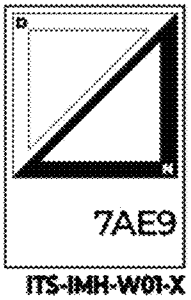

ITS-IMH-W01-X

FIG. 25B

| | | |
|---|---|---|
| 3 | **DIRECTIONAL BLACK COPY**<br>Black copy needs to light well during dusk hours and also needs to closely match white copy while illuminated. The WHOLE PANEL needs to be populated with LEDs to allow copy changes in the future. | |
| V | Vinyl/Lamination | **1ST SURFACE:**<br>3M 3635-20B Blockout white vinyl<br>**2ND SURFACE:**<br>NONE |
| A | Diffusion Material | DuLite BK50-5mm |
| L | LED and Lighting | **6500K Bitro XPro Series** |
| I | Intensity | E9 **794 cd/m²** |
| | Target Illumination Ratios Between Zones | About 25% less in lux readings than the reference |
| | LED Population Notes | CRITICAL: DIRECTIONAL COPY MAY CHANGE OVER TIME Lighting to cover the entire area. modules to populate closest to the edges of the rectangular area. |
| | Remarks | CRITICAL: Black copy to illuminate WHITE brightly and evenly, and bright enough to be seen during dusk hours |

FIG. 26A

FIG. 26B

| | | |
|---|---|---|
| 4 | **"INSTACARE" DIRECTIONAL**<br>This should be lit similarly to the white copy. | |
| V | Vinyl/Lamination | **1ST SURFACE:**<br>3M 3630-143 POPPY RED,<br>3M 3635-208 Blockout white vinyl<br>**2ND SURFACE:** NONE |
| A | Diffusion Material | 7328, 3/16" |
| L | LED and Lighting | **6500K Bitro XPro Series** |
| I | Intensity | E9 **794 cd/m²** |
| | Target Illumination Ratios Between Zones | Same as reference without the red vinyl |
| | LED Population Notes | CRITICAL: Lighting to cover the entire area. Modules to populate closest to the edges of the rectangular area. |
| | Remarks | |

FIG. 27A

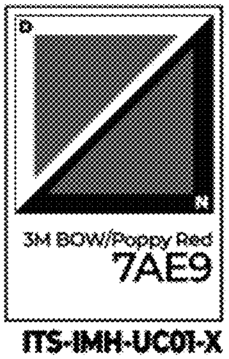

FIG. 27B

| | | |
|---|---|---|
| 5 | **"EMERGENCY" DIRECTIONAL**<br>This should be lit similarly to the white copy. | |
| V | Vinyl/Lamination | **1ST SURFACE:**<br>3M 3630-143 POPPY RED<br>**2ND SURFACE:**<br>NONE |
| A | Diffusion Material | 7328, 3/16" |
| L | LED and Lighting | **6500K Bitro XPro Series** |
| I | Intensity | E9 **794 cd/m²** |
| | Target Illumination Ratios Between Zones | Same as reference on WHITE |
| | LED Population Notes | CRITICAL: Lighting to cover the entire area. modules to populate closest to the edges of the rectangular area |
| | Remarks | |

FIG. 28A

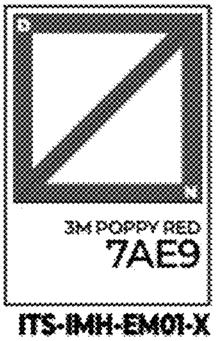

ITS-IMH-EM01-X

FIG. 28B

LED LUMINANCE AND COLOR VISUALIZATION AND SPECIFICATION SYSTEM AND METHOD

CROSS-REFERENCE TO RELATED APPLICATION

This application is a continuation of U.S. patent application Ser. No. 17/863,959, filed Jul. 13, 2022, which takes priority from U.S. Provisional Patent Application No. 63/221,573, filed Jul. 14, 2021, the contents of each of which are incorporated by reference herein in their entirety.

FIELD OF THE INVENTION

This application relates to a tool for specifying characteristics of an LED light box and a metric for specifying a lighting configuration.

BACKGROUND

Generally, it is difficult to ensure the illumination level of a light box, such as a channel letter used in LED signage. LED brand and model can be specified to ensure product quality, performance, and longevity, but it cannot control the actual illumination level of a sign face.

The illumination level (luminance) on the sign face will depend on module population. When colored vinyl is involved, the illumination level may also affect the perceived color of the vinyl (i.e., higher lighting levels may make the color appear more brighter and more saturated, while lower brightness levels may make the color appear deeper and darker).

To brand owners and managers, sign designers, architects, sign fabricators, or other people purchasing graphical LED products such as signage, it is important to achieve and maintain certain color and brightness targets that are consistent with the brand's image and meet visualization quality benchmarks (such as minimum brightness level).

In order to control the color and brightness of the LED products, specifications must be set. However, as a particular signage program may have many dimensions, shapes, and variations to any given letterset, it's very difficult and time-consuming to specify or produce a specific LED layout for every variation, while maintaining a consistent brightness and color result across the set.

However, by specifying the "END RESULT" illumination color or color temperature and luminance, it is possible to set a single intended result specification very quickly and easily, that is uniform across all letterset variations. It is then up to the LED manufacturers and sign fabricators to produce LED population layouts for each sign variation that meet the "END RESULT" target.

However, currently it is even difficult to specify end result target metrics such as luminance and LED CCT, as people don't know the relationship between luminance/cct and visible result without a visible reference. Further, visualizing a change in sign face brightness and color as a result from changing a color, opaqueness, material, or texture of a front surface of an LED product is not intuitive, and it is difficult to match the resulting illumination level with other components of an LED signage program or already existing LED units.

There is a need for a system and method for generating LED specifications based on target values, while allowing users to generate and review the end result of a particular specification prior to ordering an LED unit. There is a further need for such a system that allows a user to generate LED specifications that in turn generate target values that match other existing or previously specified LED configurations.

SUMMARY

A luminance and color specification tool described herein is a specially designed adjustable light box.

It is a tool for improved definition and process of LED layouts and specifications to assist sign designers and fabricators in producing superior and consistent results.

At its core, the tool is one or more light box with the ability for a user to select both illumination level and color temperature using a user interface, such as a digital touch-panel display.

The user may also easily apply a faceplate, such as an acrylic faceplate to the box as well as any vinyl or fabric, for visual observation of potential sign design scenarios.

One value of the tool is in its ability to calculate the luminance of any user-selected configuration in real-time, without the need to use any external measuring device.

The user-selected luminance and cct values can therefore be entered into any designer's sign specifications to ensure that all signs produced within the program will have a known target illumination. It is then up to LED manufacturers and estimators to produce layouts and BOMs that will meet the specified targets.

In some embodiments, the luminance and color specification tool actually measures and defines LUMINANCE, which is properly measured in $Cd/m^2$. In some embodiments, pressing the units button at the user interface will change the displayed luminance values on the screen from $Cd/m^2$ to LUX values In this case, it is important to note that the displayed lux values assume that the lux is being measured with the meter placed DIRECTLY on the acrylic face. This is important because lux being an illuminance measurement, will vary based on the distance away from the face that the meter is placed. (Luminance on the other hand, does not vary with the measurement distance).

In some embodiments, the lux at the face is being treated as proportional to luminance ($Cd/m^2$), with all other variables being held consistent (i.e., measurement distance). This extra conversion is useful for verification purposes, as a lux meter is much cheaper and easily accessible versus a luminance spot meter.

In some embodiments, an LED specification system is provided having at least one LED light output device. The LED light output device has an LED light source, a first exchangeable face panel selectable from a plurality of potential exchangeable face panels, and a housing for locating the exchangeable face panel relative to the LED light source and for orienting the LED light source such that light from the LED light source passes through the first exchangeable face panel.

The LED specification system further includes a user interface for selecting at least one preferred output characteristic for light from the LED light output device. The preferred output characteristic is defined by a metric value. The LED specification system further includes a transformation module for defining an LED specification value based at least partially on the defined metric value and a characteristic of the LED light source.

In some embodiments, the LED specification value is further based on an identification of the first exchangeable face panel. In some embodiments, the output characteristic is at least one of output luminance and color temperature. In some such embodiments, the at least one preferred output characteristic is output luminance, and the user interface accepts a selection of a color temperature separate from the preferred output characteristic, and the LED specification value is further based on the color temperature.

In some embodiments, the LED specification value differs based on which of the plurality of potential exchangeable face panels is selected as the first exchangeable face panel.

In some such embodiments, the housing further comprises a face panel detector, and the face panel detector detects which of the plurality of potential exchangeable face panels is selected as the first exchangeable face panel, and at least one LED light output device provides information about the selected face panel to the transformation module.

In some such embodiments, each of the potential exchangeable face panels contains a unique identifying pattern for detection by the face panel detector. Such a unique identifying pattern may be repeated at symmetrically defined locations on each of the potential exchangeable face panels, such that the unique identifying pattern can be detected by the face panel detector regardless of orientation of the first exchangeable face panel.

In some embodiments, the face panel detector is a sequence of switches, and the unique identifying pattern is a sequence of holes for selectively depressing and avoiding depression of switches of the sequence.

In some embodiments, the face panel detector is a sensor or antenna, and wherein each of the plurality of potential exchangeable face panels is provided with a radio frequency identification (RFID) tag or a near field communication (NFC) tag detectable by the sensor or antenna.

In some embodiments, the first exchangeable face panel is a combination of two or more face panels from the plurality of potential exchangeable face panels. In some such embodiments, the first exchangeable face panel is a combination of an acrylic face panel and a vinyl face panel.

In some embodiments, the LED light source is selected from a plurality of potential LED light sources for incorporation into the LED light output device, and the LED specification value differs based on which of the plurality of potential LED light sources is selected. In some such embodiments, the plurality of potential LED light sources includes at least one white LED light source and at least one color LED light source. In some such embodiments, the at least one white LED light source includes LED elements having different color temperatures.

In some embodiments, the metric value or the LED specification value depends on whether the LED light source selected is a white LED light source or a color LED light source.

In some embodiments, the housing further comprises an LED light source detector for detecting which of the plurality of potential LED light sources is incorporated into the LED light output device.

In some embodiments, the at least one LED light output device is a plurality of LED light output devices independently controllable from the user interface.

In some embodiments, the system further includes a retention element for compressing the first exchangeable face panel against the housing. In some such embodiments, the retention element is a magnetic frame that mates with magnetic elements in the housing.

In some embodiments, the LED light output device further comprises a removable shade for extending from the housing perpendicular to the direction of the face panel.

In some embodiments, upon adjusting the preferred output characteristic at the user interface based on the observed output of the LED light output device, the system outputs a corresponding defined metric value for use in an order specification.

In some embodiments, the controller further outputs a configuration file defining the defined metric value and data related to the first exchangeable face panel and the LED light source.

In some embodiments, the LED light output device further comprises a light sensor for sensing an actual output of the LED light output device and displaying the actual output of the preferred output characteristic.

In some embodiments, the LED specification value is a DMX lighting definition.

In some embodiments, the user interface is provided at a user handheld device, and the transformation module is a software module provided with the user interface.

Also provided is an LED specification kit, which may include a control unit having a user interface, a transformation module, a plurality of LED light sources, a plurality of potential exchangeable face panels, and a housing for locating at least one of the exchangeable face panels relative to one of the plurality of LED light sources.

In such an embodiment, the control unit defines a metric value corresponding to a preferred output characteristic selected at the user interface and the transformation module defines an LED specification value based on the defined metric value, a particular LED light source of the plurality of LED light sources selected, and a particular face panel selected from the plurality of potential exchangeable face panels.

In some such embodiments, the plurality of potential exchangeable face panels comprises a plurality of vinyl panels and a plurality of acrylic panels.

In some embodiments of a kit, the plurality of acrylic panels have different light transmission and diffusion characteristics.

In some embodiments, the kit also includes a removable shade for extending from the housing perpendicular to the direction of the face panel.

In some embodiments, a kit further includes a second housing for locating at least one of the exchangeable face panels relative to one of the plurality of LED light sources, wherein the transformation module defines a second LED specification value different from the LED specification value and based on one of the defined metric value or a secondary defined metric value, a particular face panel selected for the second housing and a particular LED light source panel selected for the second housing.

Also provided is a method for determining LED specifications. The method includes selecting an LED light source and applying the selected LED light source to a housing of an LED light output device, selecting at least one exchangeable face panel from a plurality of potential exchangeable face panels and applying the selected at least one exchangeable face panel to the housing opposite the selected LED light source, selecting, at a user interface, at least one preferred output characteristic for light from the LED light output device, the at least one preferred output characteristic being defined by a metric value, and defining an LED specification value based on the defined metric value, a characteristic of the LED light source, and an identification of the at least one exchangeable face panel. The method then outputs light from the LED light source based on the LED specification value.

In some embodiments, the method further includes observing the output of the LED light output device and adjusting, at the user interface, the preferred output characteristic, thereby redefining the metric value, and defining an updated LED specification value based on the redefined metric value.

In some embodiments, the method further includes outputting a configuration file defining the defined metric value and data related to the first exchangeable face panel and the LED light source.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 21A and 22A show an actual configuration associated with each zone of the signage of FIG. 20A.

FIGS. 21B and 22B show LED chips corresponding to the actual configurations of FIGS. 21A and 22A respectively and defining LED specification values and identifiers associated with the configurations.

FIG. 23B shows LED identifiers associated with zones of the signage of FIG. 23A.

FIGS. 24A, 25A, 26A, 27A, and 28A show an actual configuration associated with each zone of the signage of FIG. 23A.

FIGS. 24B, 25B, 26B, 27B, and 28B show LED chips corresponding to the actual configurations of FIGS. 24A, 25A, 26A, 27A, and 28A respectively and defining LED specification values and identifiers associated with the configurations.

DETAILED DESCRIPTION OF THE PREFERRED EMBODIMENTS

Figure 1:
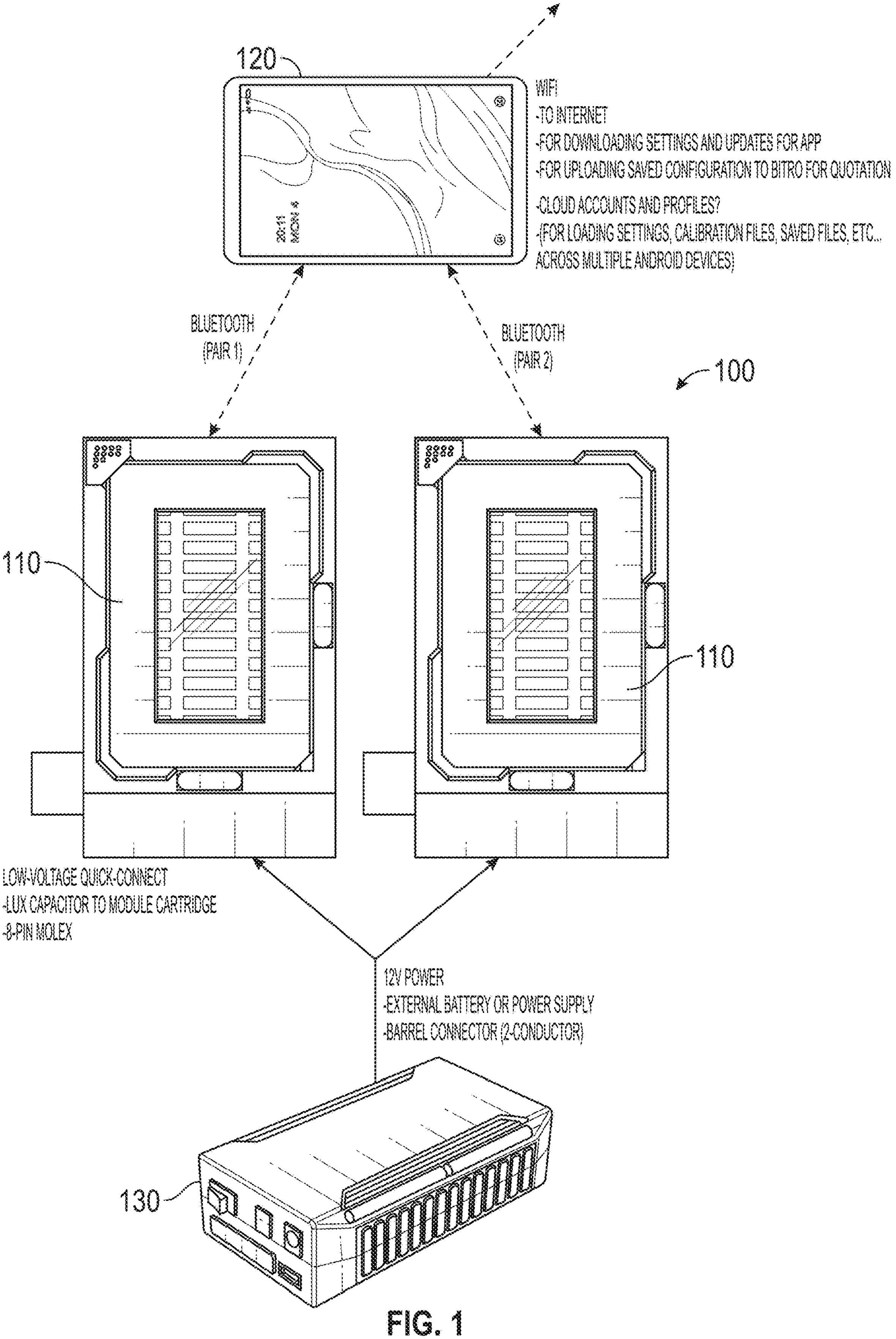
FIG. 1 shows one embodiment of an LED specification system in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 shows one embodiment of an LED specification system 100 in accordance with this disclosure. As shown, the system 100 generally comprises at least one LED light output device 110, in this case, two, a user interface 120 for selecting at least one preferred output characteristic for light from the LED light output device 110, and a transformation module, typically a software module, for defining an LED specification value. Each of these components are discussed below in more detail.

In the system provided, the at least one LED light output device 110 may be powered by a power source 130, such as a battery or an AC adaptor. Where multiple LED light output devices 110 are provided, each may be powered by a separate power source 130 or they may share a single power source, as shown. As shown, and as discussed in more detail below, where multiple LED light output devices 110 are provided, such devices may be independently controllable from a single user interface 120.

Figure 2:
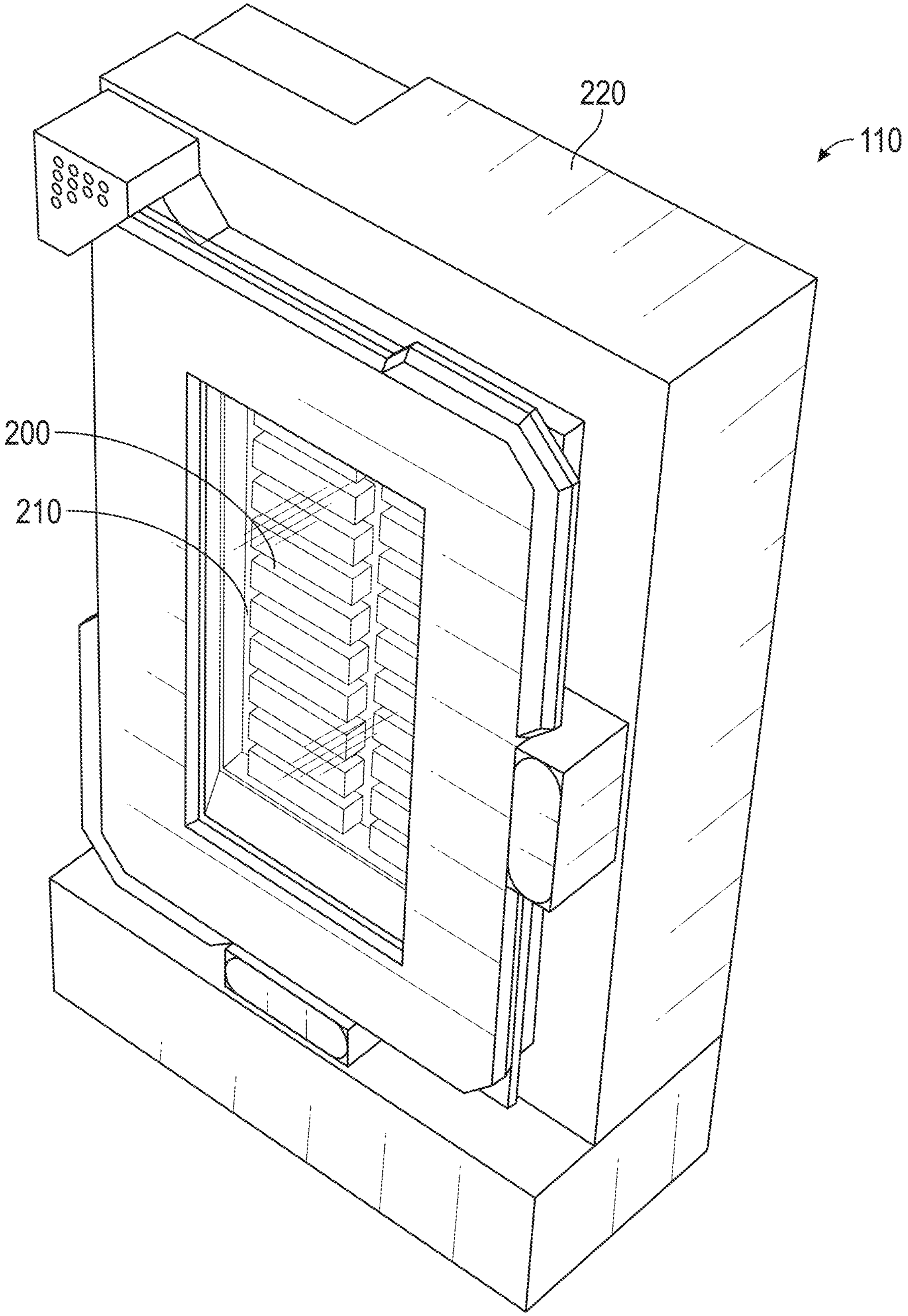
FIG. 2 shows a perspective view of one embodiment of an LED light output device for use in the LED specification system of FIG. 1.
Figure 3:
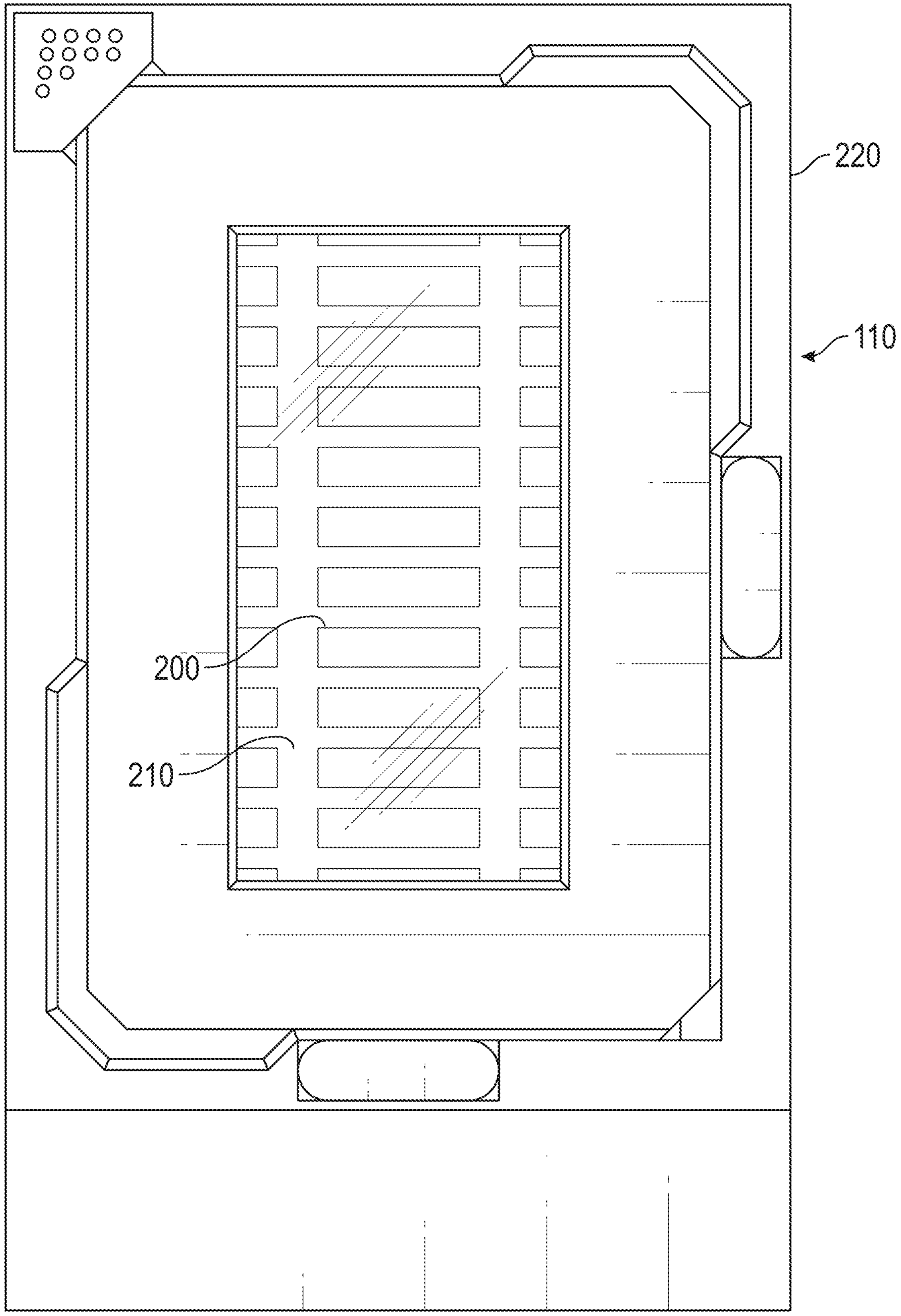
FIG. 3 shows a front view of the LED light output device of FIG. 2.
Figure 4:
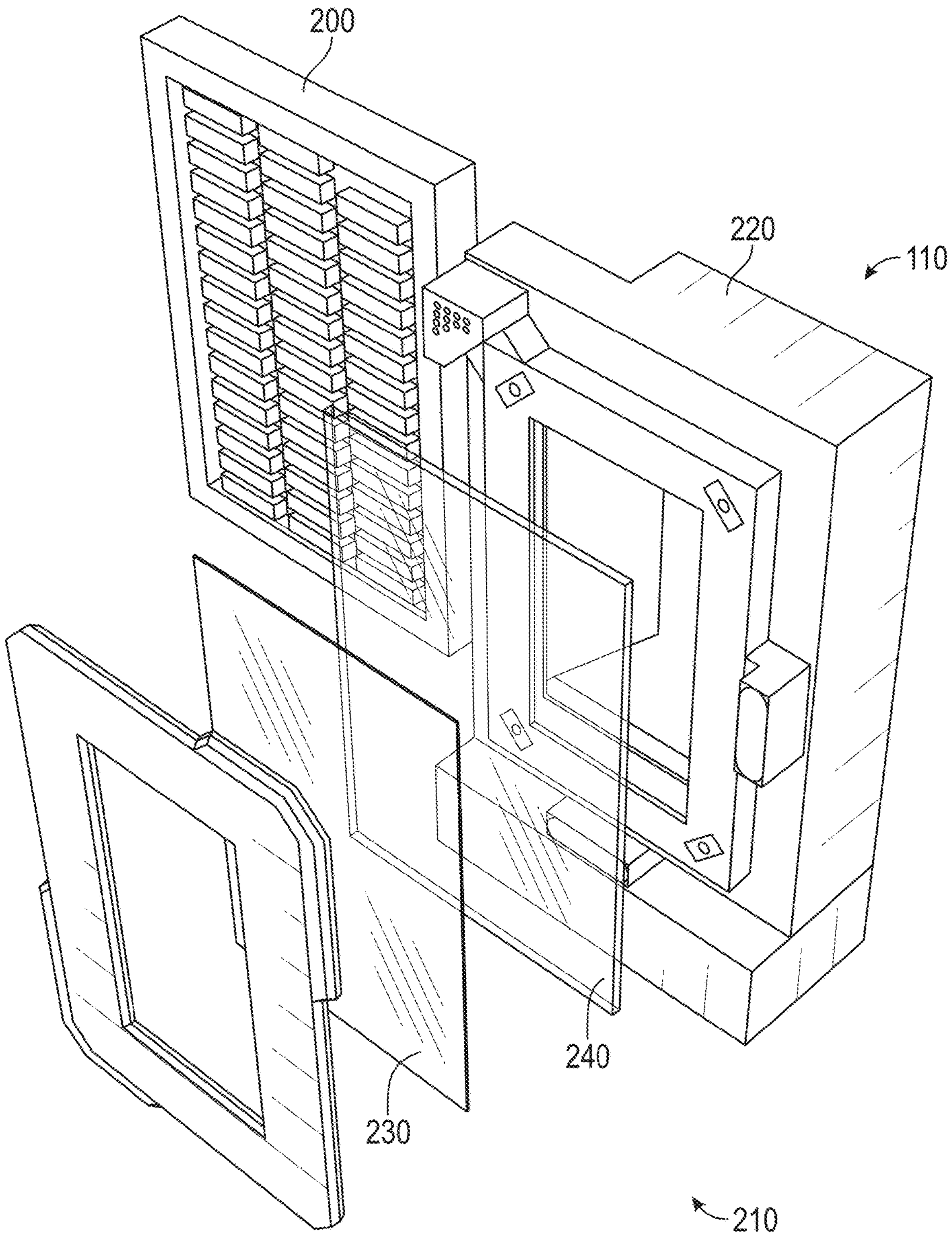
FIG. 4 shows an exploded view of the LED light output device of FIG. 2.

FIG. 2 shows a perspective view of one embodiment of an LED light output device 110 for use in the LED specification system 100 of FIG. 1. FIG. 3 shows a front view of the LED light output device 110 and FIG. 4 shows an exploded view of the LED light output device.

As shown, each LED light output device 110 typically has an LED light source 200, at least one exchangeable face panel 210, and a housing 220 for locating the exchangeable face panel 210 relative to the LED light source 200 and for orienting the LED light source such that light from the LED light source passes through the exchangeable face panel 210.

The exchangeable face panel 210 is one of a plurality of potential exchangeable face panels. This can be seen in, and is discussed in more detail in relation to, the kit of FIG. 14.

The user interface 120 is provided for selecting at least one preferred output characteristic for light from the LED light output device 110. The preferred output characteristic is typically defined by a metric value. The preferred output characteristic may be, for example, a preferred output luminance, or brightness, of the LED light output device 110. The transformation module, then defines an LED specification value based on the defined metric value, in this case representing a preferred output luminance, and further based on at least one characteristic of the LED light output device 110.

The LED specification value is generally a value provided to the LED light output device 110 that, when applied at an LED light source 200 contained by the LED light output device, generates the preferred output characteristic. The transformation module thereby defines the LED specification value based on several variables which may have an effect on the output luminance, or on other characteristics desired by a user.

In some embodiments, the preferred output characteristic may be color temperature. In other embodiments, the preferred output characteristic may be a combination of color temperature and output luminance. In the embodiment shown, the at least one preferred output characteristic is output luminance, which is then used to define the defined metric. The user interface 120 then separately accepts a selection of color temperature separate from the defined metric, and the LED specification value is based on both the defined metric value and the color temperature.

In some embodiments, the LED specification value is further based on an identification of the specific exchangeable face panel 210 present in the LED light output device 110. Because the exchangeable face panel 210 present is one of a plurality of potential face panels, the LED specification value differs based on which of the plurality of potential face panels is selected as the specific exchangeable face panel used.

Further, as shown, the selected exchangeable face panel 210 may be a combination of multiple face panels used together, such as a vinyl face panel 230 and an acrylic face panel 240. In some embodiments, different face panels may be designed to provide different characteristics. For example, the vinyl face panel 230 may be provided to simulate or provide a color, texture, or opacity of a designed light box configuration. However, the vinyl face panels may be provided in combination with the acrylic face panel 240 to better simulate a configuration for signage.

Figure 5:
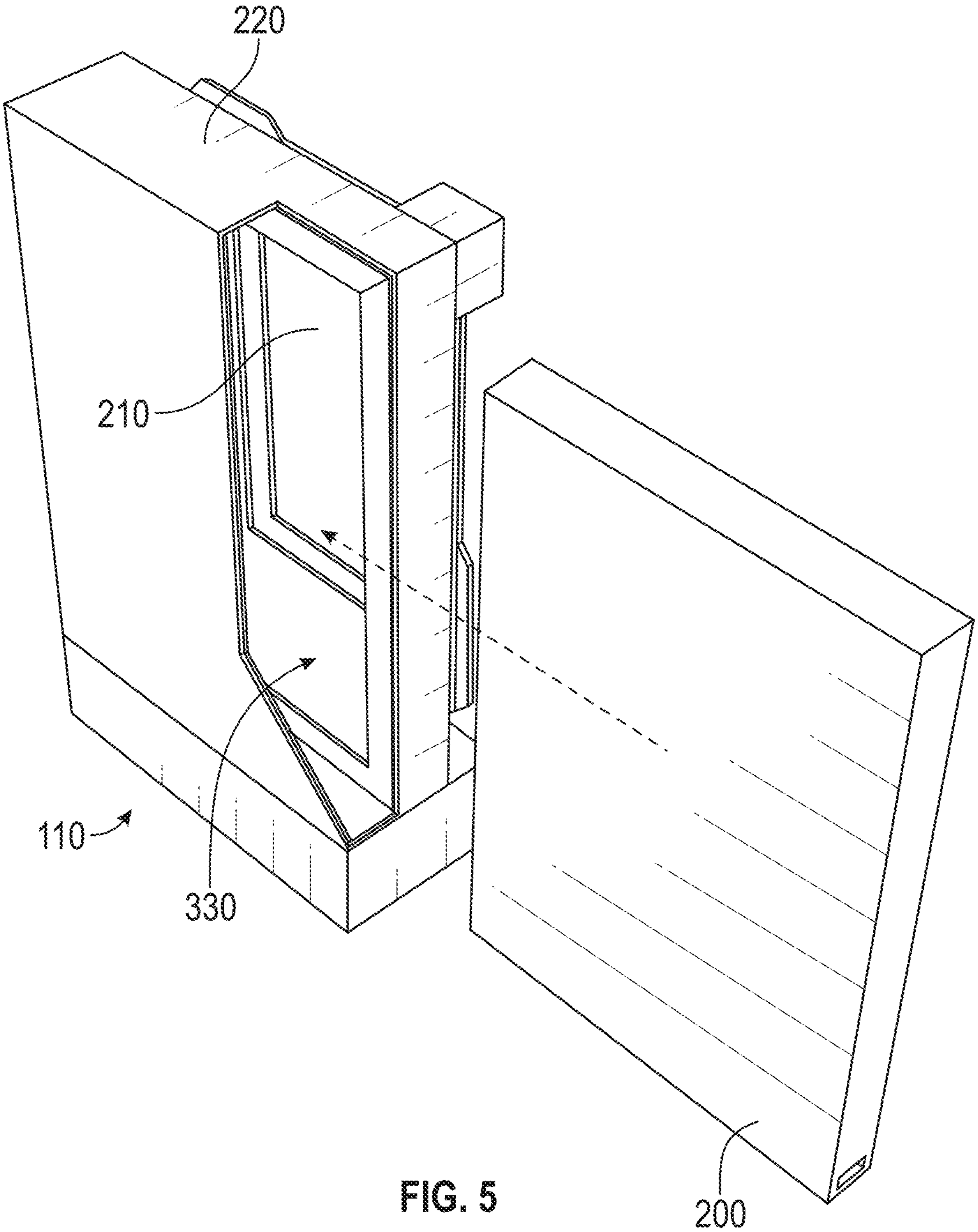
FIG. 5 shows the insertion of an LED light source in the LED light output device of FIG. 2.
Figure 6:
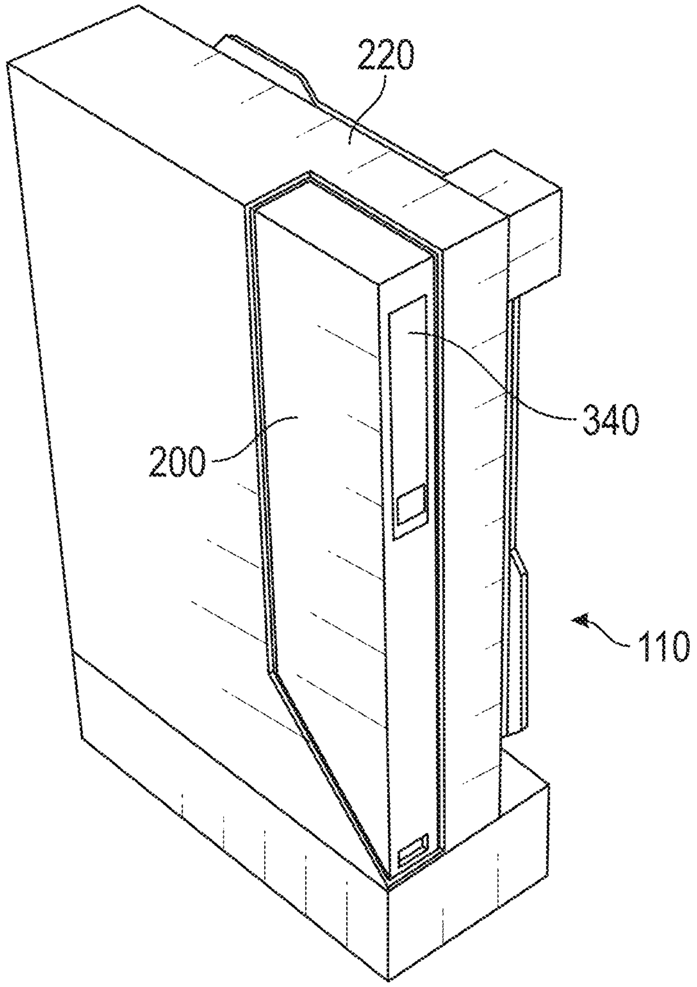
FIG. 6 shows a rear perspective view of the LED light output device of FIG. 2.

FIG. 5 shows the insertion of an LED light source 200 in the LED light output device 110 of FIG. 2. FIG. 6 shows a rear perspective view of the LED light output device 110 of FIG. 2.

Figure 14:
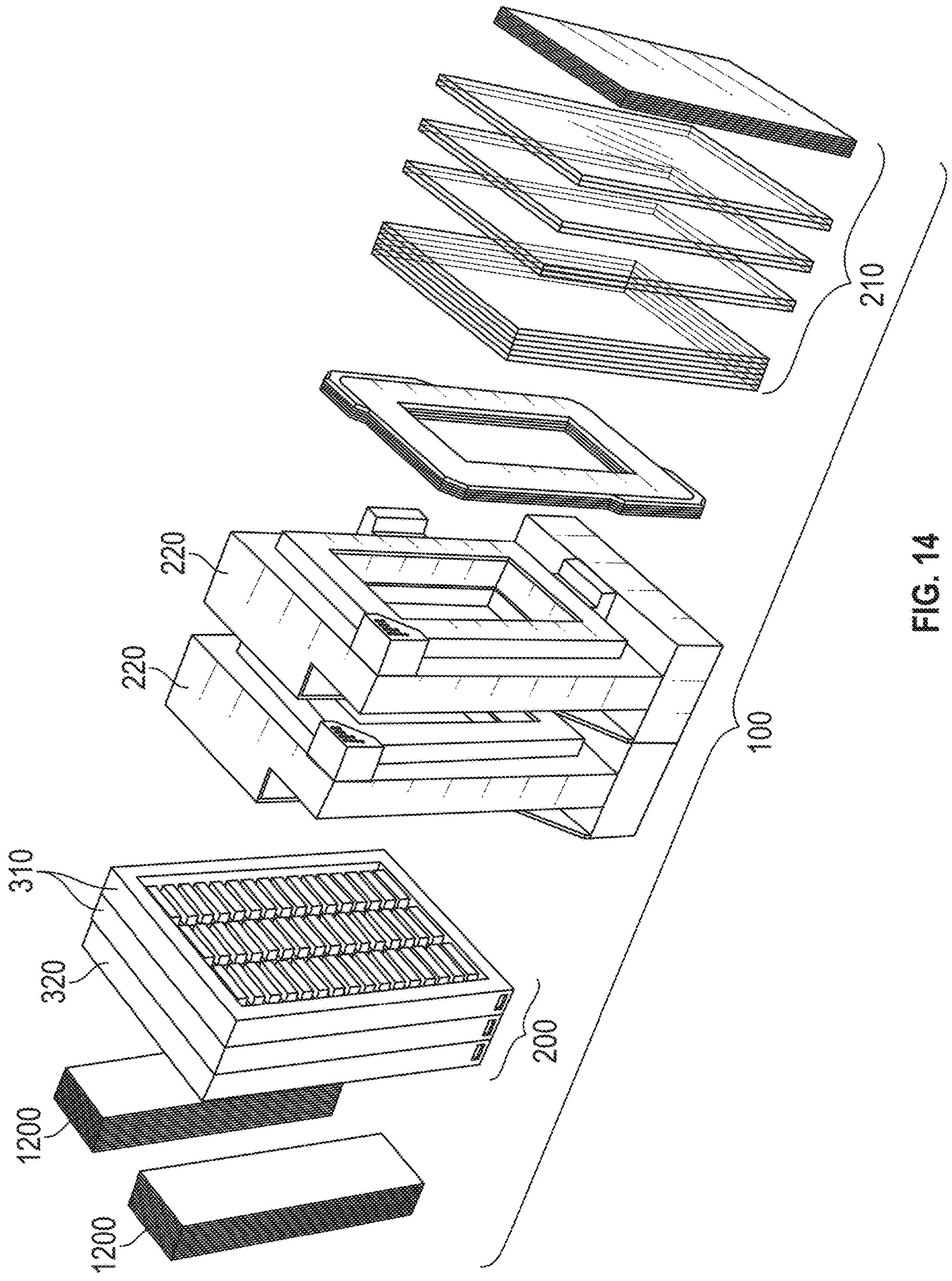
FIG. 14 shows an LED specification kit in accordance with this disclosure.

In some embodiments, LED specification value may vary based on additional factors as well. As shown in FIG. 14, for example, the LED light source 200 may be one of several available LED light sources. Accordingly, the LED light source 200 may be selected from a plurality of potential LED light sources for incorporating into the LED light output device 110. In the embodiment shown, the LED light source 200 may be provided as a light module cartridge, which may then be slid into an opening, functioning as a docking location 330, of the housing 220 of the LED light output device 110.

The specific LED light source 200 selected for integration into the LED light output device 110 may result in different output characteristics. For example, the LED light sources 200 may be color cartridges 310 or white light cartridges 320. Further, when LED elements are manufactured, small differences may change the resulting light output. Accordingly, the LED specification value may differ based on which of the plurality of potential LED light sources 200 is selected. The LED specification value may therefore be based on the category of LED light source 200 selected, such as color or white light 310, 320, and it may separately be based on a calibration value specific to a particular LED light source 200.

In some embodiments, the housing 220 of the LED light output device 110 may have a detector for determining which of the plurality of potential LED light sources 200 has been located in the housing. This may be incorporated into a connector at the docking location 330, and it may determine which category of LED light source 200 has been incorporated. In some embodiments, the detector may further determine which particular LED light source 200 has been incorporated, and the transformation module may then determine if there is any calibration data for the LED light source 200 that should be incorporated into the calculation of the LED specification value.

In some embodiments, calibration data or the category of the LED light source 200 may be considered as part of the LED specification value without directly detecting the value. The LED light sources 200 may be provided with an ID label 340 or could be otherwise defined, such that a user may directly enter details related to the particular cartridge inserted. Similarly, there may be a scannable code, such as a QR code or an RFID tag, that may be scanned by a user or a user interface device for acquiring data that can then be used as part of the LED specification value. In any event, once the category of LED light source 200 or the specific LED light source is known and entered within the system, the LED specification value may depend at least partially on which LED light source 200 has been included.

In some embodiments, the defined metric value itself may vary depending on the LED light source 200 selected for inclusion in the LED light output device 110. For example, where the defined metric value corresponds to luminance, such metric value may be defined differently, or may be measured differently, for colored light output and for white light output. As such, the metric value may depend on whether the LED light source 200 selected is a white LED light source or a color LED light source. In such embodiments, LED specification value may incorporate both the metric value defined based on the category of LED light source 200 selected as well as calibrated data associated with the specific LED light source selected.

Figure 7:
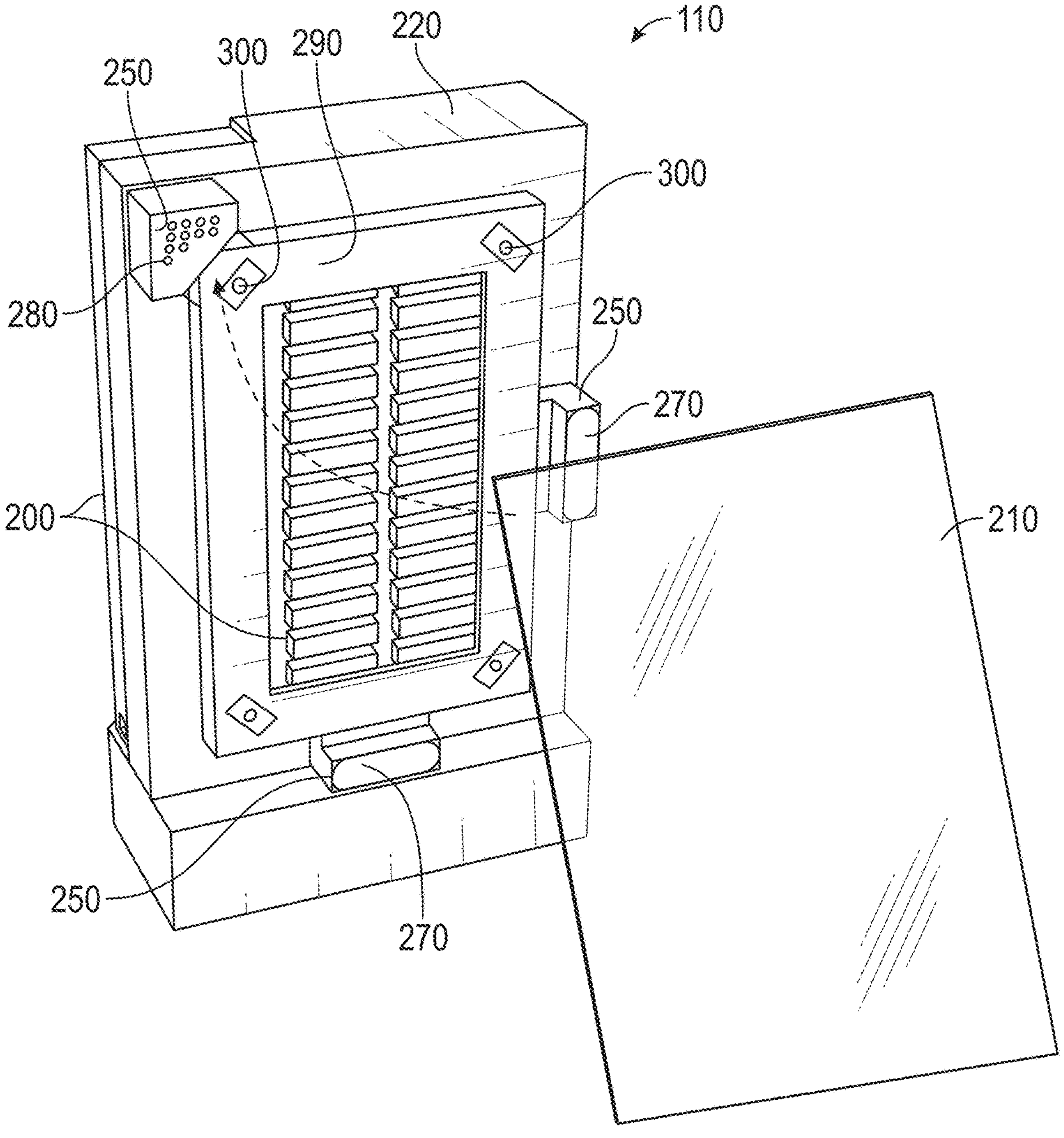
FIG. 7 shows the application of a face panel to the LED light output device of FIG. 2.
Figure 8:
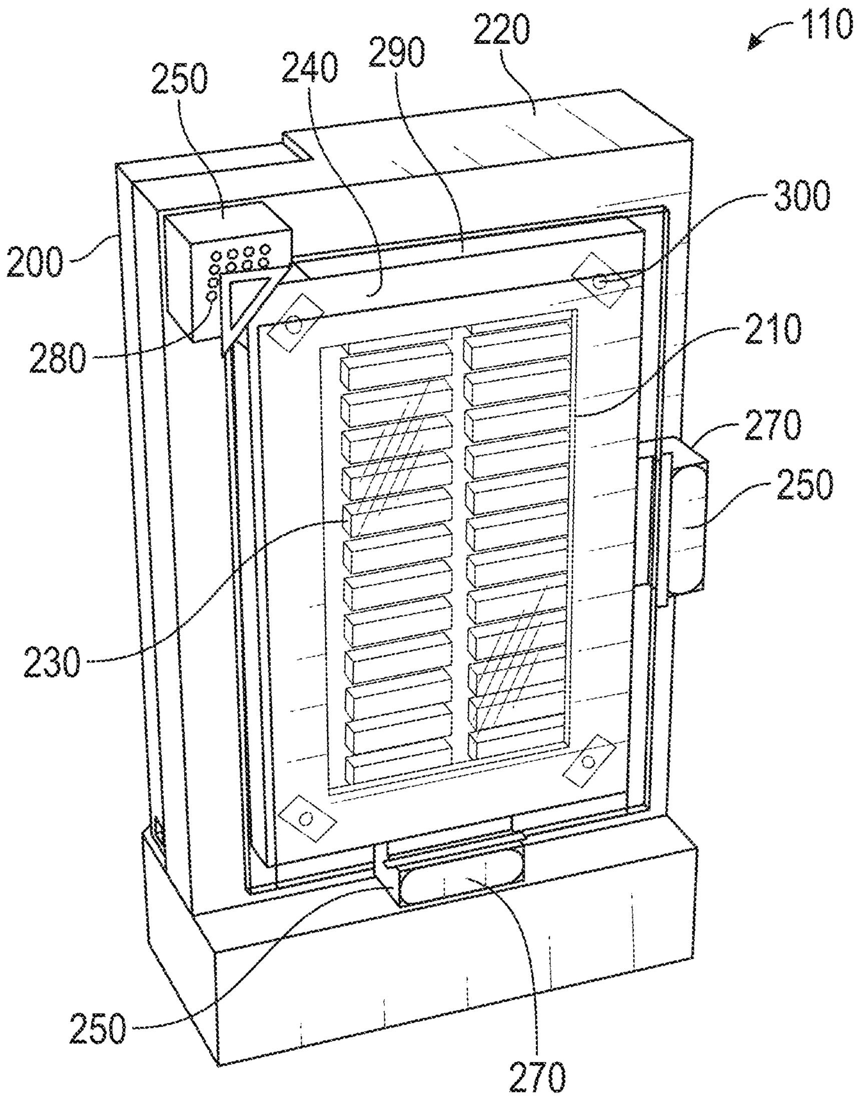
FIG. 8 shows the partial installation of a face panel in the LED light output device of FIG. 2.
Figure 9:
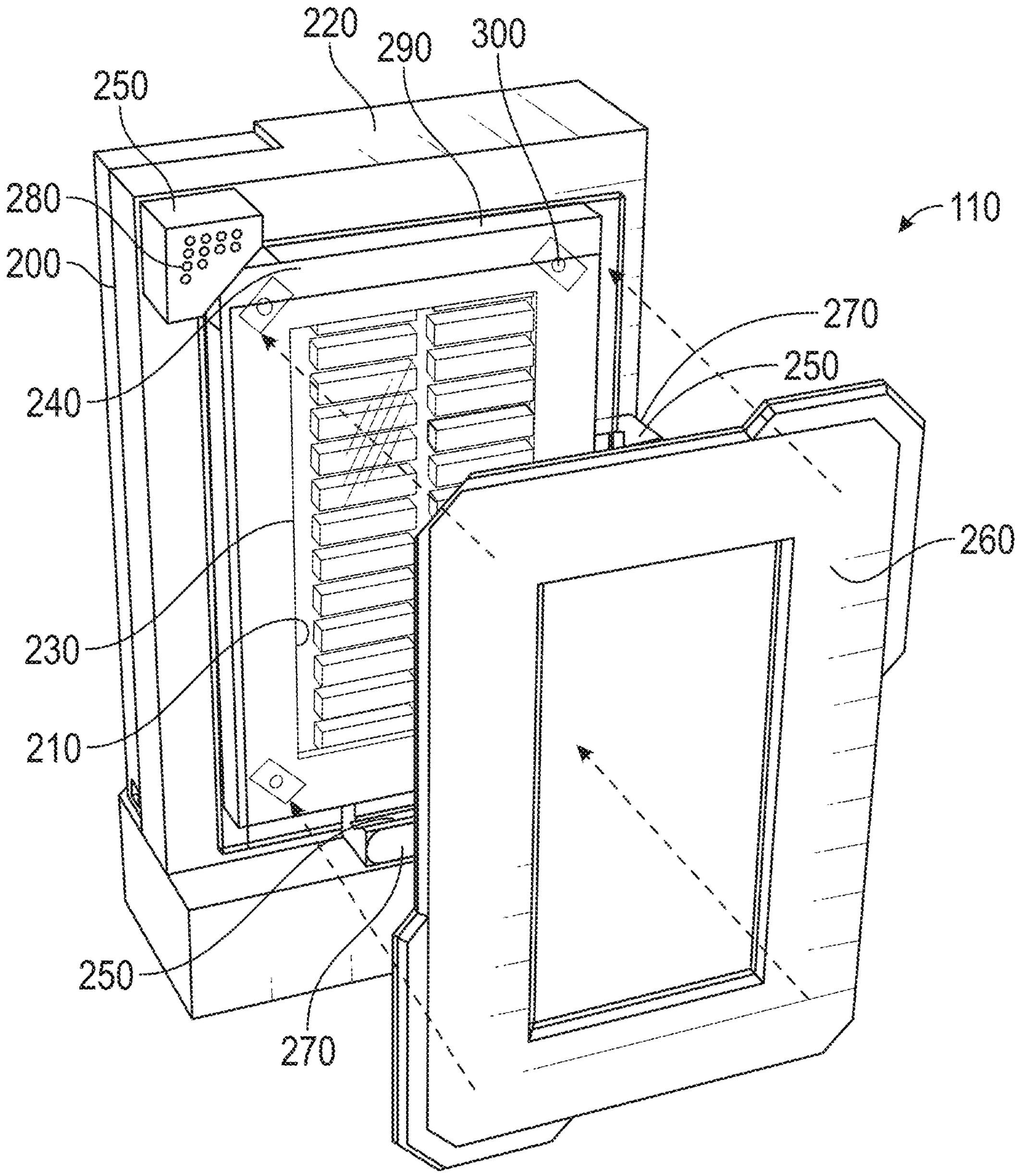
FIG. 9 shows the fixing of a face panel to the LED light output device of FIG. 2.
Figure 10:
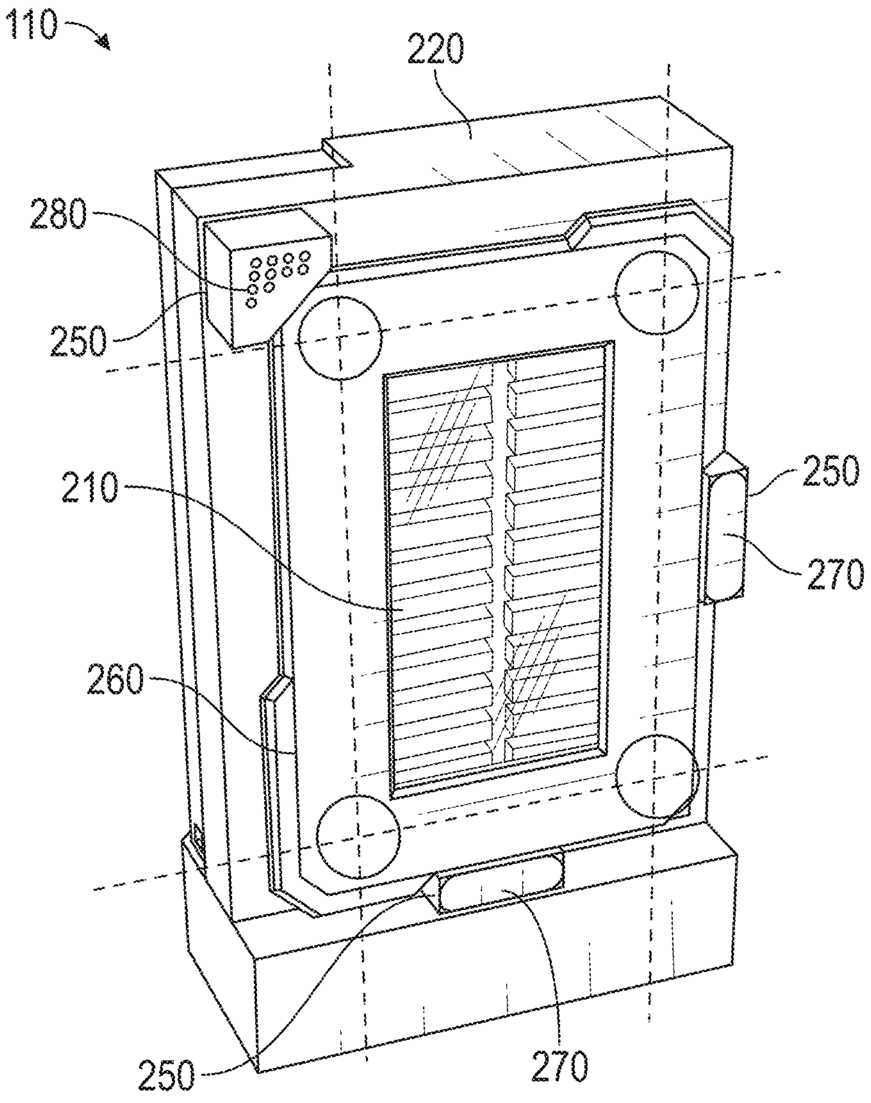
FIG. 10 shows the alignment of a face panel on the LED light output device of FIG. 2.
Figure 11:
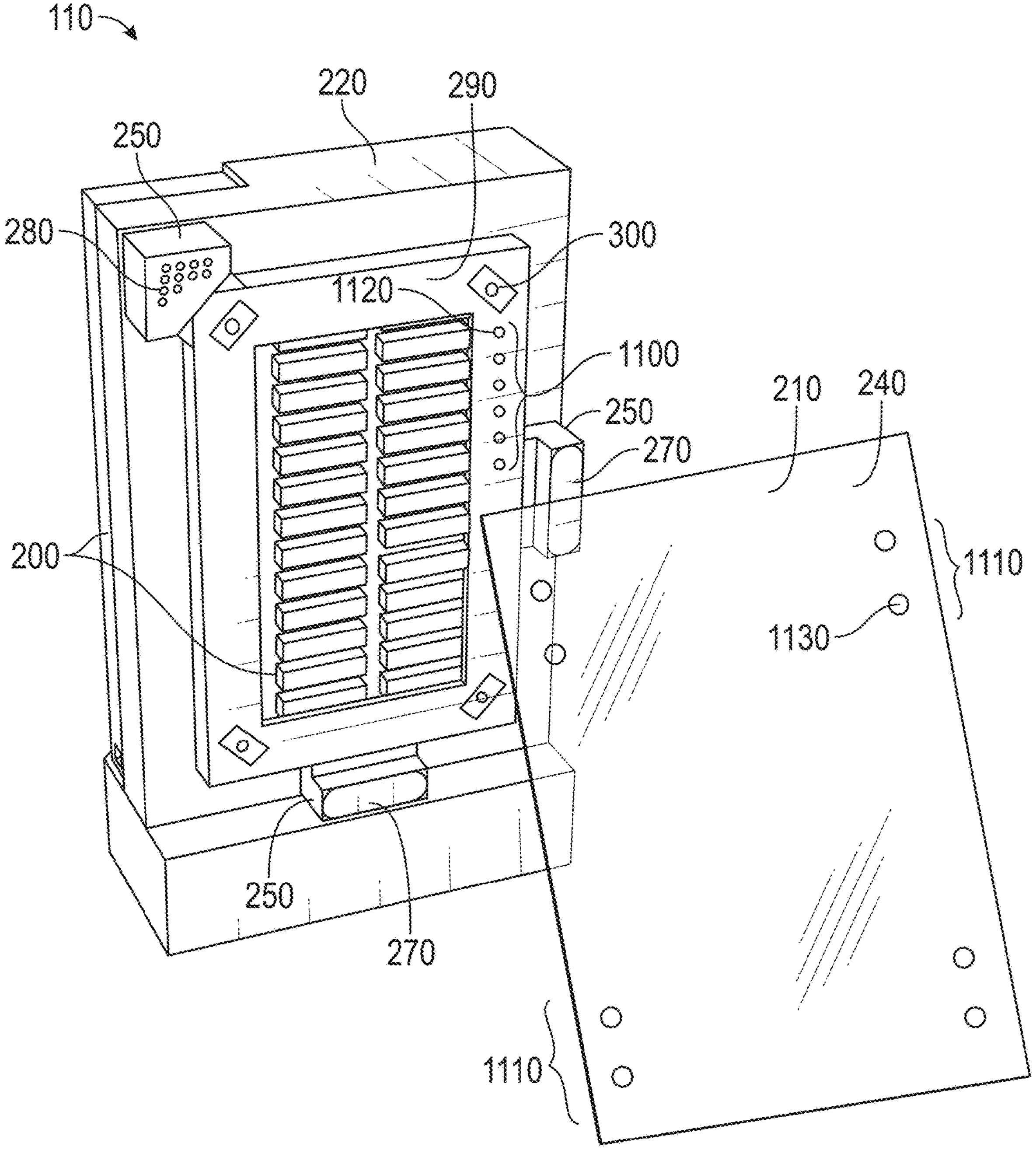
FIG. 11 shows a face panel detector in the context of the LED light output device of FIG. 2.

FIG. 7 shows the application of a face panel 210 to the LED light output device 110 of FIG. 2. FIG. 8 shows the partial installation of a face panel 210 in the LED light output device 110 of FIG. 2. FIG. 9 shows the fixing of a face panel 210 to the LED light output device 110 of FIG. 2. FIG. 10 shows the alignment of a face panel 210 on the LED light output device 110 of FIG. 2. FIG. 11 shows a face panel detector 1100 in the context of the LED light output device 110 of FIG. 2.

The LED light output device 110 may further comprise a plurality of clips 250, or other locating elements, for locating or positioning the exchangeable face panel 210.

The clips 250 may function in concert with at least one additional retention element 260 for securing the face panel 210 by, for example, compressing the selected exchangeable face panel 210 against the housing 220. The retention element 260 is generally configured such that more than one face panel 210, such as independent vinyl 230 and acrylic 240 panels can be applied together and compressed against the housing 220. In the embodiment shown, the retention element is a magnetic frame 260 which mates with corresponding magnetic elements in the housing 220. The embedded magnetic elements may then work in concert with the clips 250 and the magnetic frame 260 to consistently locate and align the exchangeable face panel 210 on the housing 220. This is shown, for example, in FIG. 10.

The clips 250 may be provided in a configuration for supporting a precise alignment of a selected face panel 210. As shown, the clips 250 may take the form of a pair of side claims 270 and a corner clip 280. The corner clip 280 may be undercut, or partially undercut, so as to support a corner of a selected face panel 210. As shown in FIG. 7, during installation of a face panel 210, the face panel may then be slid into the undercut of the corner clip 280 and then braced against the side clips 270 such that the panel is precisely located by the three clips 250. As shown, the side clips 270 may be angled inwards, such that even in the absence of the magnetic frame 260, the face panel 210 inserted is held in place to a limited extent.

As shown in FIG. 8, where two face panels 210 are being applied, and when one is acrylic 240 and a second is vinyl 230, the acrylic panel is applied first and securely located. The vinyl panel 230 may then be applied and set down on the side clips 270, such that light emitted from the housing 220 passes through both the acrylic and vinyl panels 230, 240.

As shown in FIG. 9, once all face panels 210 selected are in place, the magnetic frame 260 is applied to the housing 220, thereby securing the location of the face panel or panels 210.

As shown in FIG. 10, in some embodiments, the magnetic frame 260 may function in concert with the magnets embedded in the housing 220 such that the frame 260 is located spaced apart from the clips 250. This would avoid the risk of the edges of the selected face panel 210 being crushed upon application of the frame 260 in the event that alignment is imperfect.

As shown, the housing 220 may comprise a raised mounting frame 290. Such a mounting frame 290 may comprise magnets 300 for mating with the magnetic frame 260, and may therefore facilitate the precise locating and securing of the face panels 210 by clamping them between the magnetic frame and the mounting frame.

In some embodiments, such as that shown in FIG. 11, the housing 220 of the LED light output device 110 includes a face panel detector 1100, which may detect which of the plurality of potential exchangeable face panels 210 is selected for use in the LED light output device 110. In embodiments in which the transformation module bases the LED specification value at least partially on the specific face panel 210 selected, the face panel detector 1100 or the LED light output device 110 may then provide information about the selected face panel 210 to the transformation module.

In some embodiments, each of the potential exchangeable face panels 210 contains a unique identifying pattern 1110 for detection by the face panel detector. In some such embodiments, the unique identifying pattern may be repeated at symmetrically defined locations on each of the potential exchangeable face panels, such that the unique identifying pattern 1110 may be detected by the face panel detector 1100 regardless of orientation of the selected exchangeable face panel 210.

As shown, the face panel detector 1100 may be a sequence of switches 1120. Each switch may then provide a binary output. The unique identifying pattern 1110 may then be a sequence of holes 1130 for selectively depressing and avoiding the depression of corresponding switches 1120 of the sequence of holes. The holes may thereby provide a sequenced binary output that can define the particular face panel 210 selected.

In some embodiments, as discussed above, the particular face panel 210 applied may be a combination of two or more face panels, such as a vinyl face panel 230 and an acrylic face panel 240. Such two face panels 210 may be independently selected from the plurality of potential exchangeable face panels. In such an embodiment, the face panel detector 1100 may be configured to detect both panels independently, or they may detect the particular combination. For example, where the two face panels include an acrylic panel 240, to be inserted first, and to be followed by a vinyl panel 230, the face panels 210 provided may be configured such that the acrylic face panel provides more open holes in a sequence of holes 1130, and such that the vinyl panel 230 blocks several holes left open by the acrylic panel 240. Alternatively, the various face panels 210 may be definable by a user, either alone or in combination.

In some embodiments, the face panel detector is a sensor or antenna embedded within the light box. In such embodiments, each of the potential exchangeable face panels 210 may further include a radio frequency identification (RFID) tag or a near field communication (NFC) tag embedded within the panel, so as to be detectable by the sensor or antenna.

Figure 12:
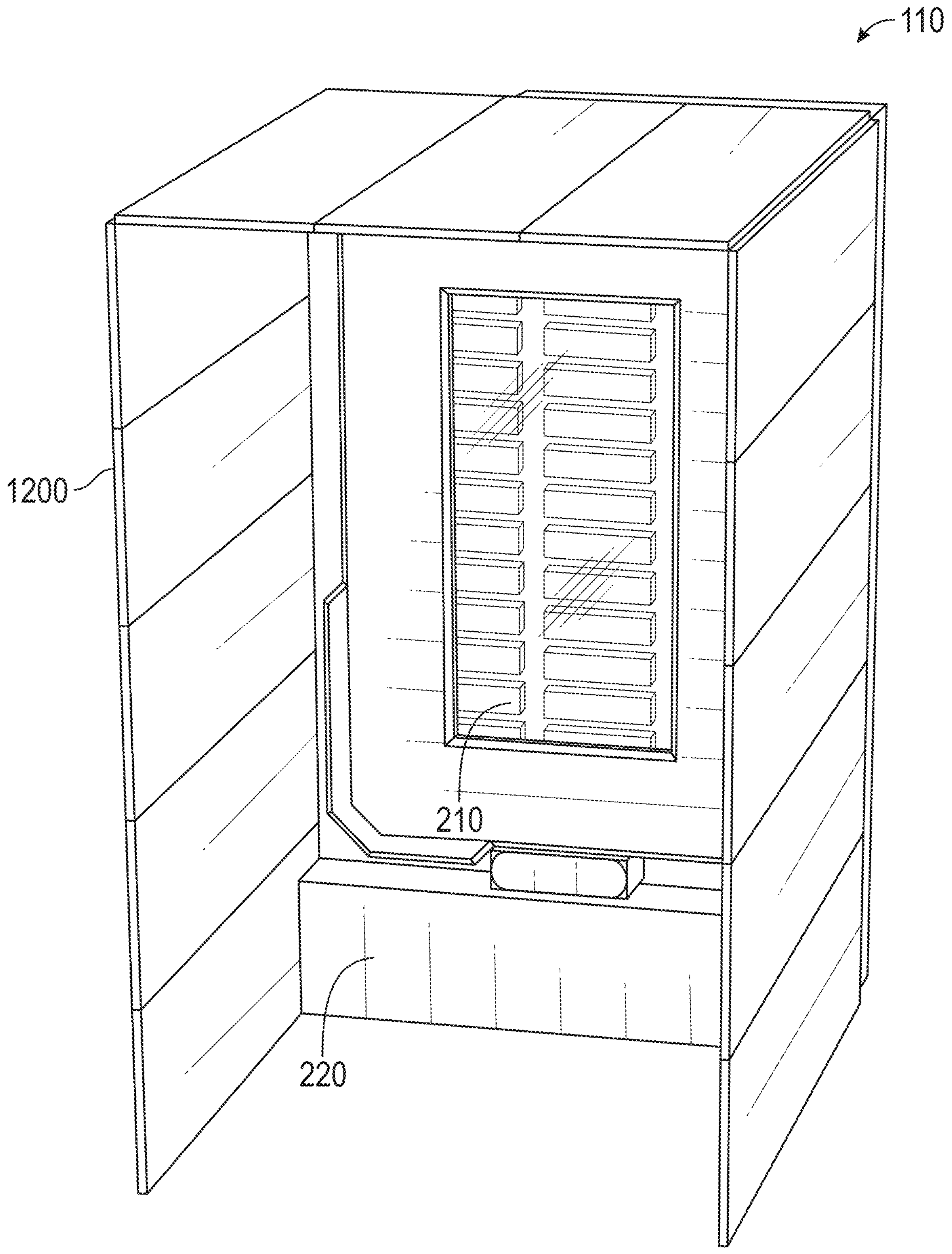
FIG. 12 shows a shade applied to the LED light output device of FIG. 2.
Figure 13:
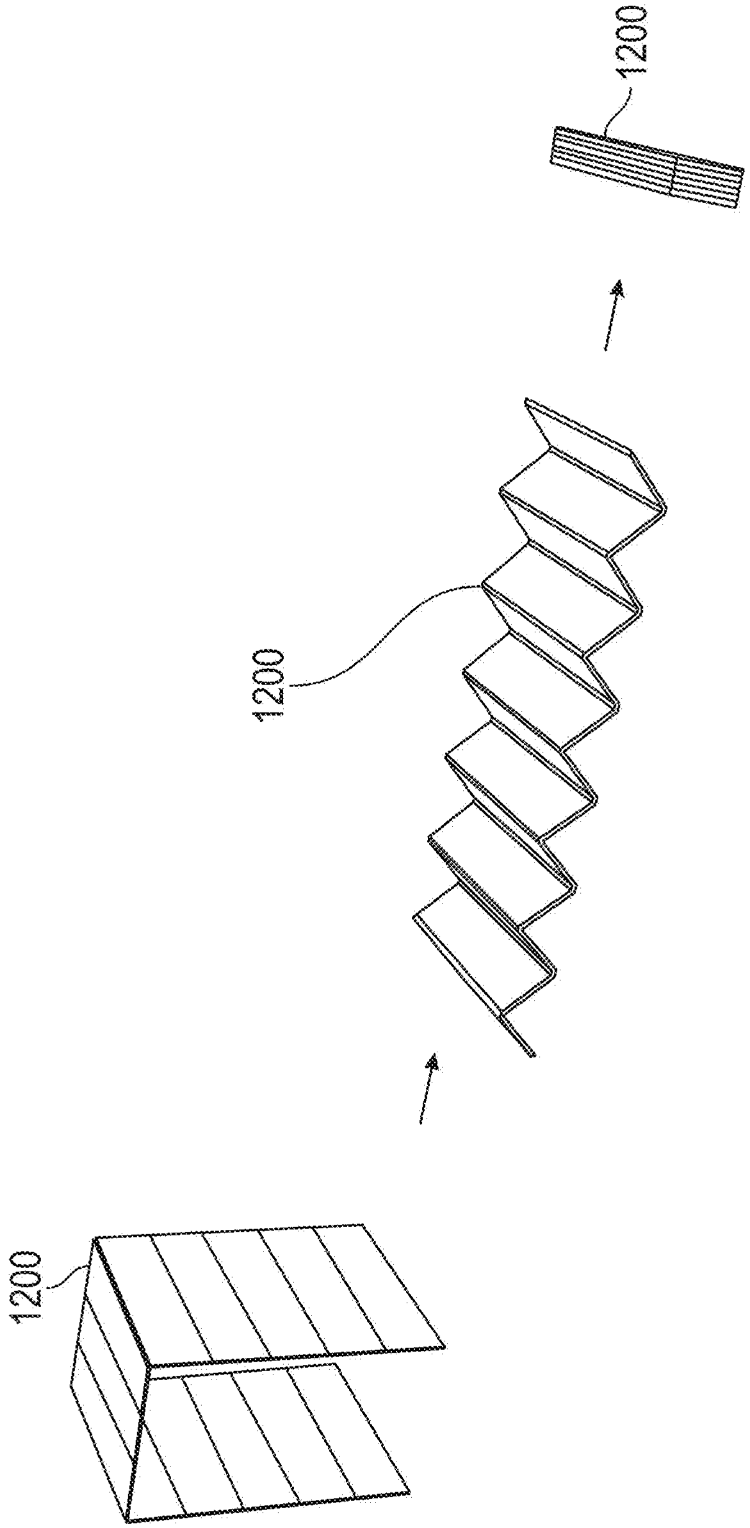
FIG. 13 shows the folding of the shade of FIG. 12.

FIG. 12 shows a light shade 1200 applied to the LED light output device 110 of FIG. 2. FIG. 13 shows the folding of the light shade 1200 of FIG. 12. As shown, the light shade 1200 may be a removable shade for shielding the light output of the light output device 110 from the effects of environmental light. The light shade 1200 may be a removable shade, and it may extend from the housing 220 perpendicular to the direction of the face panel 210. When in use, the light shade 1200 may be attached to the housing 220 by a fixation mechanism, such as magnets, Velcro, buttons, a track, or any other appropriate fixation mechanism. When removed from the housing 220, the light shade 1200 may collapse for storage, as shown in FIG. 13.

In some embodiments, in addition to the definition of an LED specification value based on a preferred output characteristic of a user, the LED specification system 100 may further compare the preferred output characteristic to an actual output of the LED light output device 110. Accordingly, the LED light output device 110 may further comprise a light sensor for sensing an actual output of the LED light output device. The system 100 may then display, at the user interface 120, a measure of the actual output of the LED light output device 110, which can then be compared to the preferred output characteristic.

In some embodiments, a provided light sensor may be used to adjust the actual output to better correspond to the preferred output characteristic. In some such embodiments, such a light sensor may be used to evaluate or correct mismatches between the determined LED specification value generated by the transformation module and the preferred output characteristic selected by a user.

In some embodiments, the LED specification value generated by the transformation module is a Digital Multiplexing (DMX) lighting definition, which can then be transmitted using standard DMX protocols. In some embodiments, such DMX lighting definitions, or any other format in which the LED specification value is presented, may be transmitted to the LED light output device 110 using standard RDM protocols. In some embodiments, the LED specification value is transmitted using Bluetooth protocols or other wireless or wired protocols.

Figure 18:
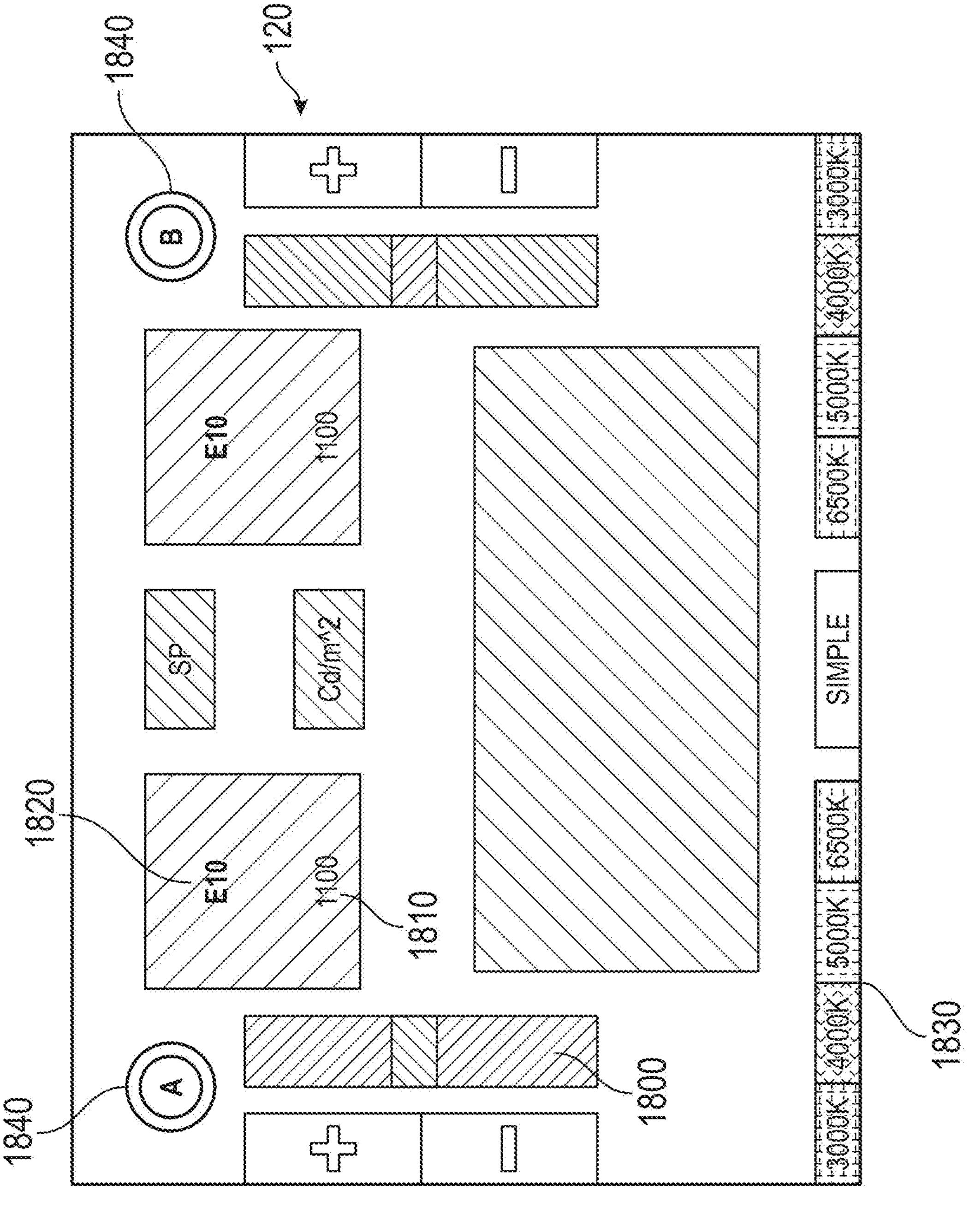
FIG. 18 shows an example of a user interface for use with an LED specification system.

In some embodiments, the user interface 120 is provided at a user handheld device. This may be a software application operated on a standard user device, such a tablet or smartphone as shown in FIG. 1. Alternatively, the user interface 120 may be provided as a custom device provided to act as a controller for the system 100 described herein. One example of a user interface 120 that can be provided at a user handheld device, or at any other form of user access terminal, is shown in FIG. 18.

The system 100 described may be used to evaluate a light box outputting light having user defined preferred output characteristics. Accordingly, a user may create a selection and view the result of characteristics selected. The user may then modify selected values until they are satisfied with the resulting output. Upon confirming that a set of defined output characteristics are acceptable, a user may save or output a configuration file defining the defined metric value and data related to the LED light output device 110 configuration that generated the acceptable output characteristics. As such, the configuration file may include data related to the first exchangeable face panel 210 and the LED light source 200 incorporated into the LED light output device 110 at the time.

FIG. 14 shows an LED specification kit corresponding to the system 100 in accordance with this disclosure. As shown in FIG. 1, the kit includes a control unit 120 as well as a transformation module, which may potentially be provided in the form of a software module or software modules run on a user's personal device or otherwise run on hardware devices and therefore not shown as part of the kit of FIG. 14.

The kit 100 further comprises a plurality of LED light sources 200, in this case including at least one color cartridge 320 and at least one white cartridge 310. The kit further includes a plurality of potential exchangeable face panels 210, typically including acrylic 240 and vinyl 230 panels. Such panels 210 could be use alone or in combination. Typically, for example, vinyl 230 panels are not sufficiently rigid to be used alone and are used in combination with supporting acrylic 240 panels. Additional panels may be included as well, such as plexiglass, diffuser panels, or specialty panels designed to interact with other panels in combinations. This may include, for example, dulite panels.

The kit may further include a housing 220 for locating at least one of the exchangeable face panels 210 relative to one of the plurality of LED light sources 200.

As discussed above, when using the kit 100 shown, the control unit typically defines a metric value corresponding to a preferred output characteristic selected at the user interface 120 and the transformation module defines an LED specification value based on the defined metric value, a particular LED light source 200 selected, and a particular face panel 210 or combination of face panels selected.

The different acrylic panels 240 provided and the different vinyl panels 230 provided may have different characteristics. For example, each of the acrylic panels may have different light transmission and diffusion characteristics.

The LED specification kit 100 may further include a removable light shade 1200 for extending from the housing 220 in a direction perpendicular to the direction of the face panel 210.

As shown, many components of the LED specification kit 100 may be duplicated so as to allow for a user to compare multiple configurations. As such, the LED specification kit 100 may include a second housing 220 for locating at least one of the exchangeable face panels 210 relative to one of the plurality of LED light sources 200. The transformation module may then define a second LED specification value different from the LED specification value defined for the first housing 220, and the second LED specification value may be based on one of the defined metric value or a secondary defined metric value along with the particular face panel 210 selected for the second housing 220 and the particular LED light source 200 selected for the second housing.

Figure 15:
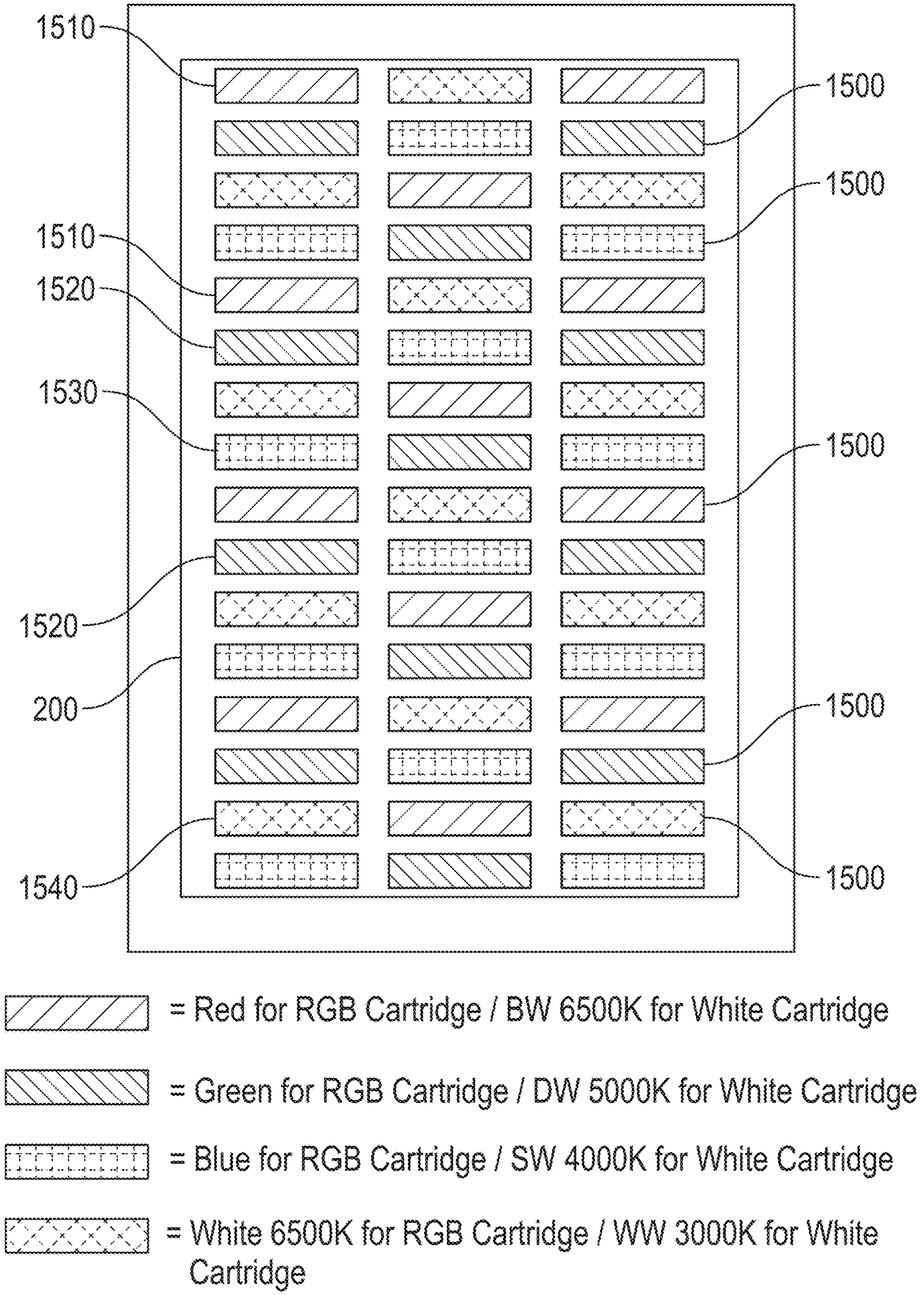
FIG. 15 shows an LED light source for use in the LED specification kit of FIG. 14.

FIG. 15 shows an LED light source 200 for use in the LED specification kit 100 of FIG. 14. As shown, the LED light source 200 may be either a color LED light source or a white LED light source. However, in any event, different LED elements 1500 of the LED light source 200 may differ from each other.

In the case of a color LED light source 200, the different LED elements 1500 may comprise sets of red 1510, green 1520, blue 1530, and white 1540 LED elements which can then combine to form color combinations. The colors described would be, for example, for a traditional RGB configuration, but other color combinations and configurations may be possible as well.

In the case of a white LED light source 200, however, the different LED elements 1500 may comprise sets of BW 6500K color temperature LEDs 1510, DW 5000K color temperature LEDs 1520, SW 4000K color temperature LEDs 1530, and WW 3000K color temperature LEDs 1540.

Accordingly, the LED specification value may define the activation of different color LEDs in a color LED light source 200, while it may define the activation of LEDs at different color temperatures in a white LED light source.

Figure 16:
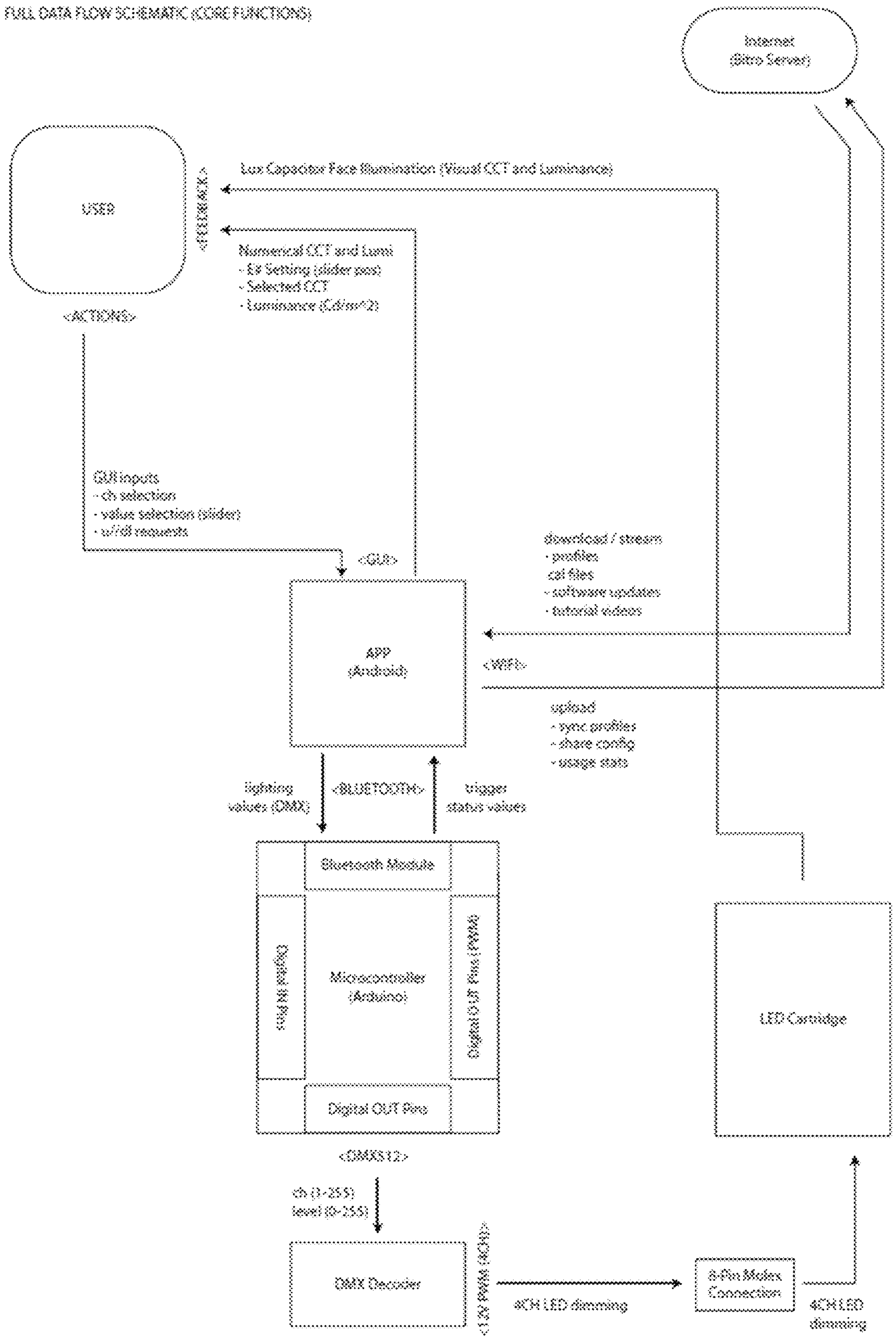
FIG. 16 shows a schematic diagram illustrating an embodiment of an LED specification system.
Figure 17:
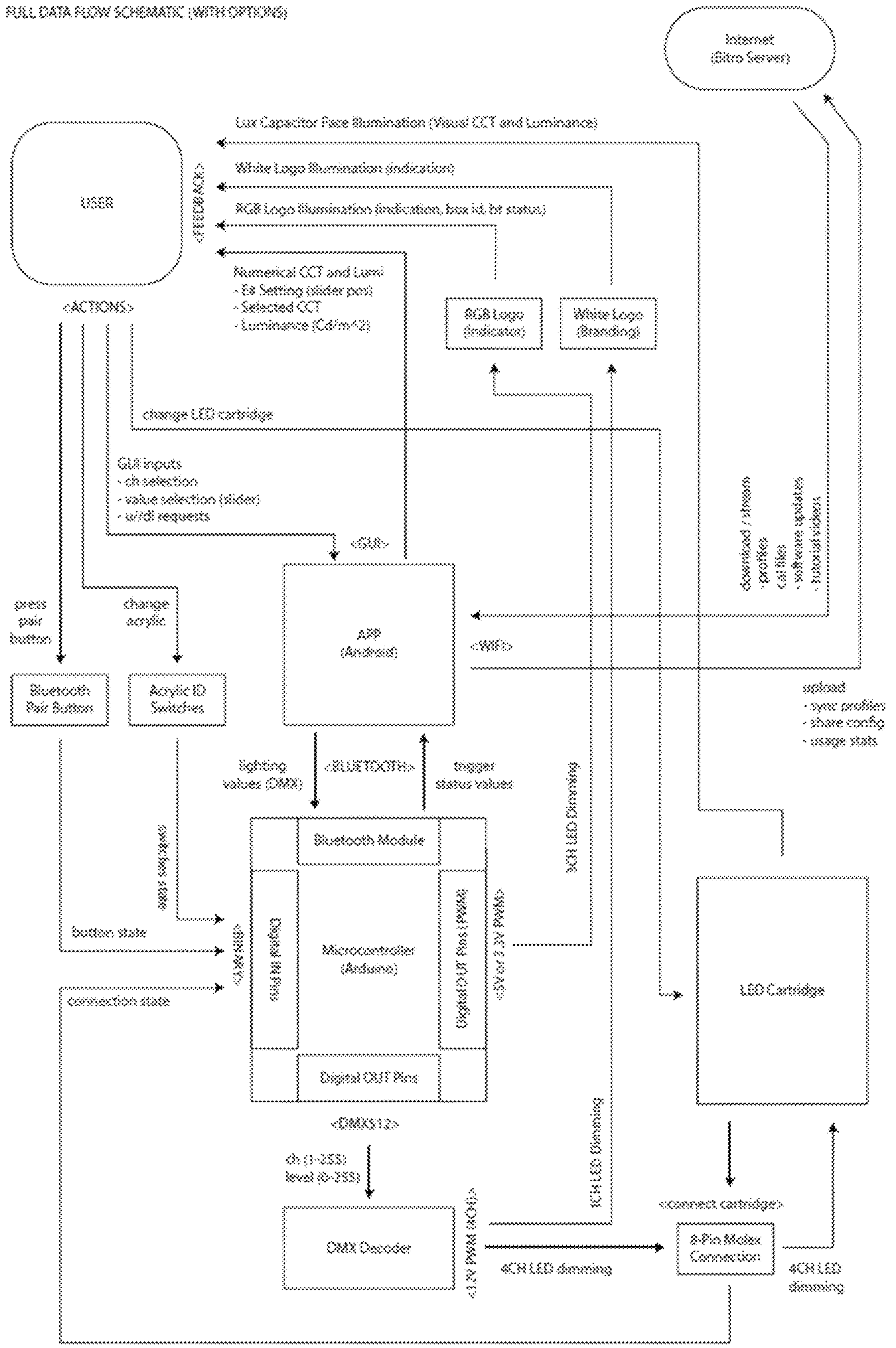
FIG. 17 shows a schematic diagram illustrating an embodiment of an LED specification system.

FIG. 16 shows a schematic diagram illustrating an embodiment of an LED specification system 100. FIG. 17 shows a schematic diagram illustrating an embodiment of an LED specification system 100.

Figure 19:
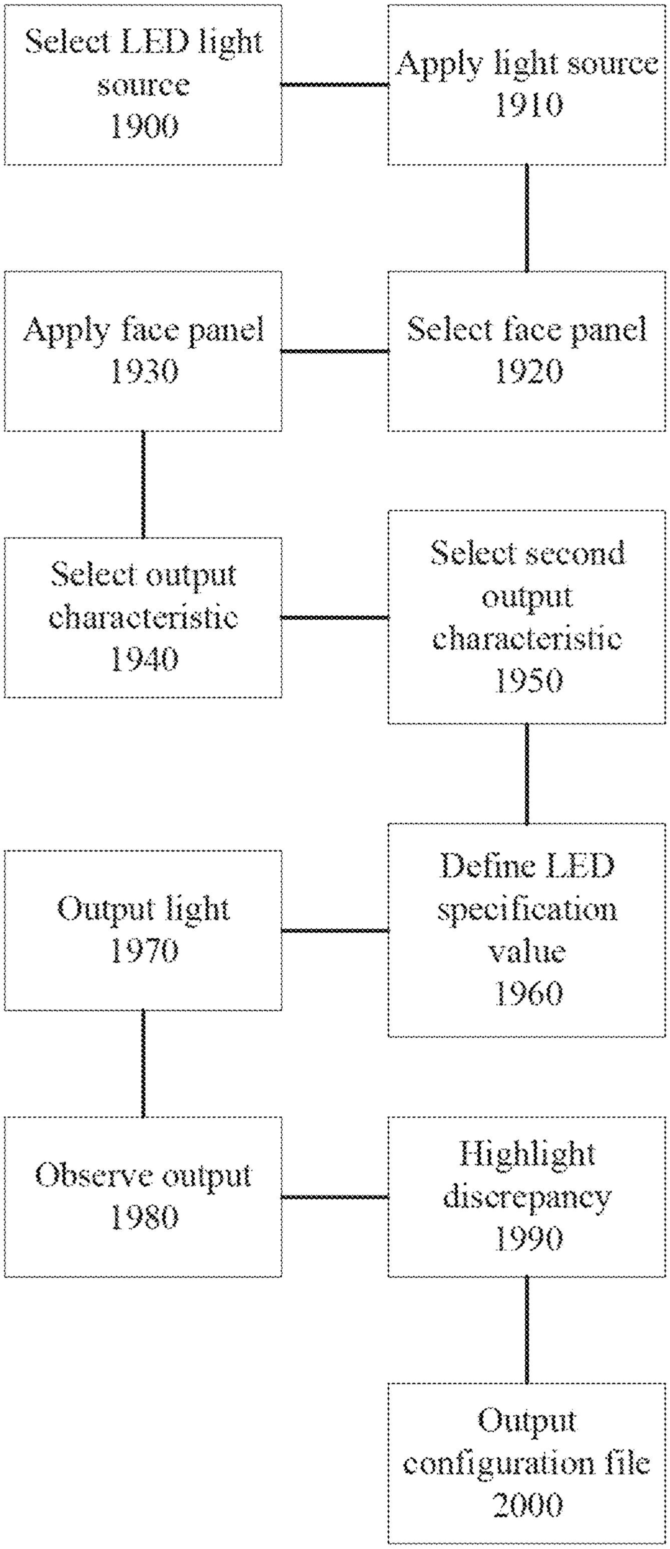
FIG. 19 is a flowchart showing a method for determining LED specifications in accordance with this disclosure.

FIG. 18 shows an example of a user interface for use with an LED specification system 100. FIG. 19 is a flowchart showing a method for determining an LED specification, which may be implemented in the LED specifications system 100 described herein.

Such a method may include first selecting, or instructing a user to select an LED light source 200 (at 1900) and to apply the selected LED light source to a housing 220 of an LED light output device 110 (at 1910).

The method may then include selecting, or instructing a user to select, at least one exchangeable face panel 210 from a plurality of potential exchangeable face panels (at 1920)

and applying the selected panel or panels to the housing 220 opposite the selected LED light source 200 (at 1930). The at least one face panel 210 selected may be a single panel or it may be a combination of panels designed to work in concert. As discussed above, the face panels 210 may be a combination of materials, such as acrylic 240 and vinyl 230.

The user then selects and a user interface 120 accepts such a selection of at least one preferred output characteristic for light from the LED light output device 110. (at 1940). The selected output characteristic may be, for example, a desired luminance, and it may be defined by a metric value.

The metric value defining the user selected preferred output characteristic may comprise standard units or it may be a metric value configured for ease of use in the system 100 described herein. One or both such values may be shown in a user interface 120 such as that shown in FIG. 18. For example, a user may define a luminance by locating a slider 1800 in the user interface 120. The selected location in the slider 1800 may then be translated into a standard measurement, such as Cd/m^2, resulting in a first measurement 1810, and it may then be further translated into a propriety value, such as an E #1820.

In some embodiments, optionally, the user interface 120 may provide an option for a user to define a second desired output characteristic (at 1950). Accordingly, as shown, the user interface 120 may provide a user selection for color temperature 1830.

Once the metric value is defined (at 1940), an LED specification value may be defined (at 1960) based on the defined metric value, a characteristic of the LED light source 200 selected (at 1910) and an identification of the at least one exchangeable face panel 210 selected (at 1920). The system 100 may acquire information about the selected light source 200 and face panel or panels 210 automatically, such as by using sensors, or such information may be entered manually by a user.

In any event, once the LED specification value is defined (at 1960), the system 100 may then output light from the LED light source 200 based on the LED specification value (at 1970).

In some embodiments, rather than having a user directly select a preferred output characteristic (at 1940), the user may instead control an actual output of the LED light output device. Accordingly, a user may adjust various characteristics of the LED light output device directly in order to generate a lighting result and then review the actual resulting output at a particular time. In such an embodiment, the LED specification value may be defined (at 1960) based on an actual configuration of the LED light output device at the particular time.

The method may be duplicated for two distinct housings 220 such that a user can compare two different selected preferred output characteristics or different housing configurations. Accordingly, the user interface may distinguish between A and B control sets 1840 duplicating all user selections.

In some embodiments, the method may optionally further comprise observing an output of the LED light output device 110 (at 1980), such as by using a sensor, to confirm that the light output corresponds to the user selected preferred output characteristic. If the observation or detection of the actual light output does not correspond to the preferred output characteristic, this may indicate a software error, a detection or user identification error in the selection of the LED light source 200 or face panel 210, or some calibration error. As such, the system 100 may automatically adjust the LED specification value or it may output to the user interface the actual light output in order to highlight the discrepancy (at 1990).

In some embodiments, the method may further comprise outputting a configuration file (at 2000) defining the defined metric value and data related to the actual configuration of the system 100 in which the metric value was implemented, such as data related to the first exchangeable face panel 210 and the LED light source 200. Similarly, the configuration file output (at 2000) may define the LED specification value at the particular time resulting from an actual configuration selected by the user.

The configuration file output (at 2000) may define the LED specification value at the particular time, thereby defining the actual face panel 210, LED light source 200, and an output luminance of the actual configuration selected by the user.

In some embodiments, the transformation module may output a configuration file (at 2000) containing an identifier representing the LED specification value at the particular time, where the identifier does not encode the actual LED specification value. For example, the configuration file may include a representative identifier that does not encode the underlying data, and therefore cannot be reverse engineered. Instead, such an identifier may be valid within a proprietary component selection system or database.

Figures 20A, 20B:
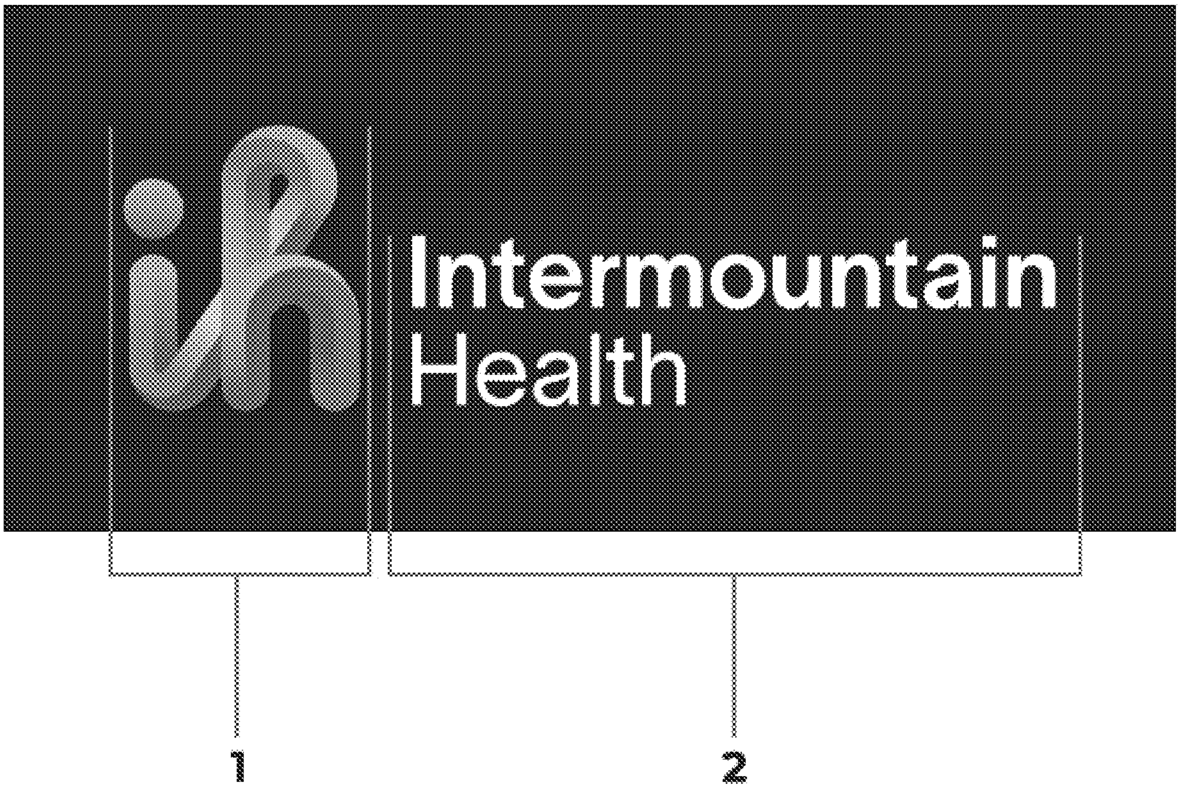
FIG. 20A shows signage with LED specifications determined using a method in accordance with this disclosure.
FIG. 20B shows LED identifiers associated with zones of the signage of FIG. 20A.

FIG. 20A shows signage with LED specifications determined using a method in accordance with this disclosure. FIG. 20B shows LED identifiers associated with zones of the signage of FIG. 20A. Accordingly, as shown, the LED signage may have two distinct zones 1 and 2. The two zones may then have corresponding identifiers, referred to as an "Illumitone Number" such as those identifiers output in the LED configuration file. In the example shown, each identifier is a string beginning with ITS.

Figure 20C:
FIGS. 20C and 20D show the signage of FIG. 20A as viewed during the day and during the night respectively.
Figure 20D:

FIGS. 20C and 20D show the signage of FIG. 20A as viewed during the day and during the night respectively. The overall specifications may provide such diagrams and may be paired with the identifiers along with various additional descriptions and instructions. For example, the particular identifiers may be defined for an exterior channel letter set, pin mounted to a backer panel and wall or raceway-mounted to a building façade. The lighting specifications may further indicate that the lighting is to be off during the day and on during dusk hours and night. The day and night illustration of FIGS. 20C and 20D may then show the expected results if the instructions are followed.

FIGS. 21A and 22A show an actual configuration associated with each zone of the signage of FIG. 20A. The actual configuration may illustrate the specifications associate with the lighting plan, and may specify a surface material, a diffusion material, specific LED products for use in the lighting device, and an intensity or luminance associated with the lighting plan. These various characteristics of the resulting lighting plan may be selected by way of the LED specification system described herein.

FIGS. 21B and 22B show LED chips corresponding to the actual configurations of FIGS. 21A and 22A respectively and defining LED specification values and identifiers associated with the configurations. Accordingly, once the configuration is selected, the corresponding configuration is encoded in an LED specification value (e.g., 2AE13 in FIG. 21B and 7AE11 in FIG. 22B) which may contain information that can be extracted. Alternatively, or in addition, the LED specification value may be replaced in the configuration file with an identifier, i.e., the ITS number, which can be used to order corresponding lighting assemblies but cannot be directly reverse engineered to identify the corresponding configuration.

The LED chips shown may contain be a physical chip, as in the context of a traditional paint chip, or a digital "chip" provided to a user after selecting their approved lighting configuration. a first portion highlighting the appearance of the selected configuration during daytime and nighttime, while a second portion provides one or both of a LED specification value and identifier for achieving the illustrated effect.

Figure 21C:
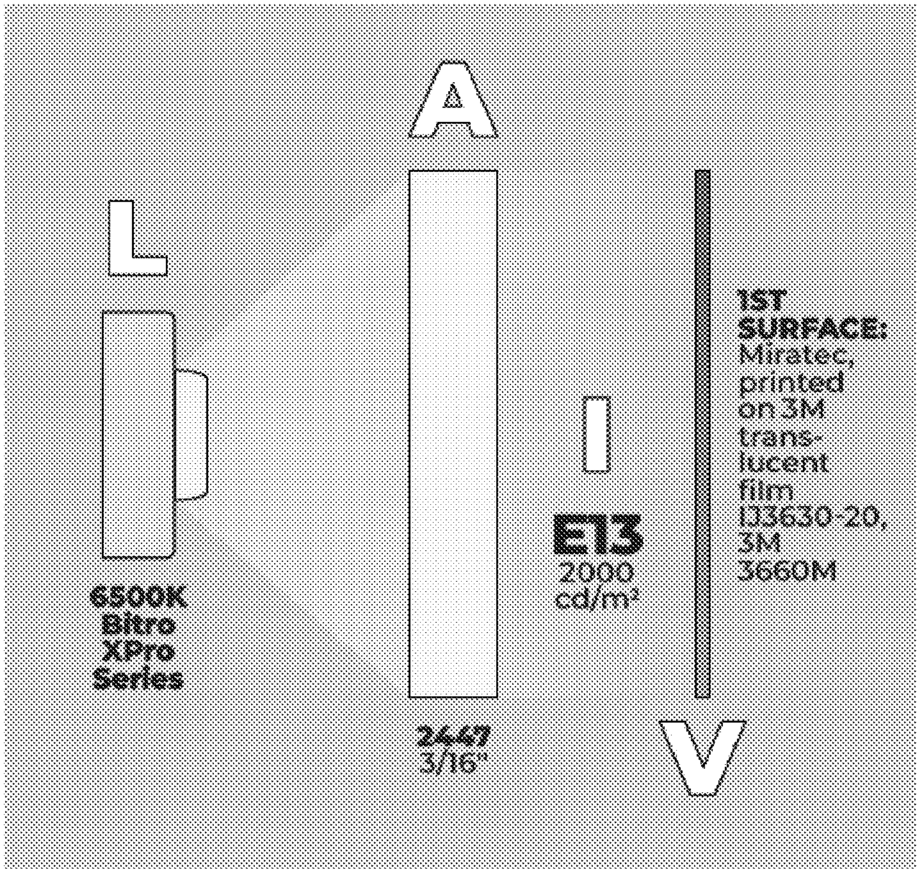
FIGS. 21C and 22C show a schematic correspondence between the actual configurations of FIGS. 21A and 22A and physical components of LED lighting devices.
Figure 22C:
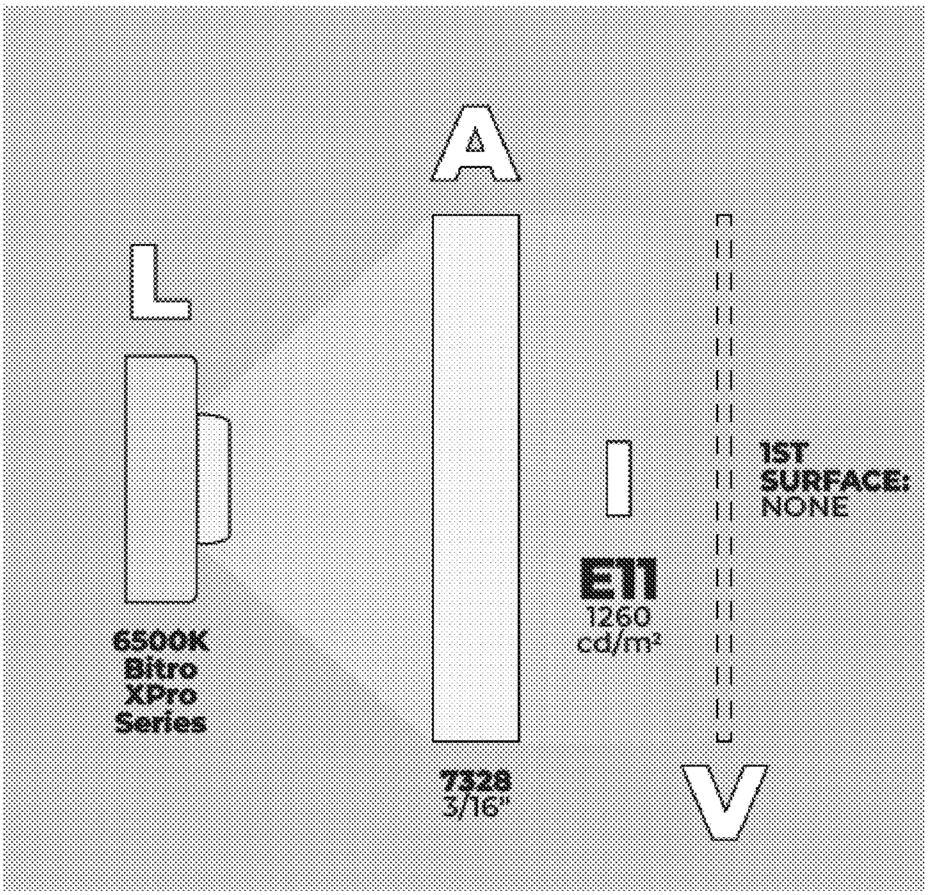

FIGS. 21C and 22C show a schematic correspondence between the actual configurations of FIGS. 21A and 22A and physical components of LED lighting devices. Accordingly, the configuration includes the characteristics VALI, with V representing the face panel (typically vinyl), A representing a diffusion material, L representing the LED light source, and I representing an intensity or luminance of the configuration.

Figure 23A:
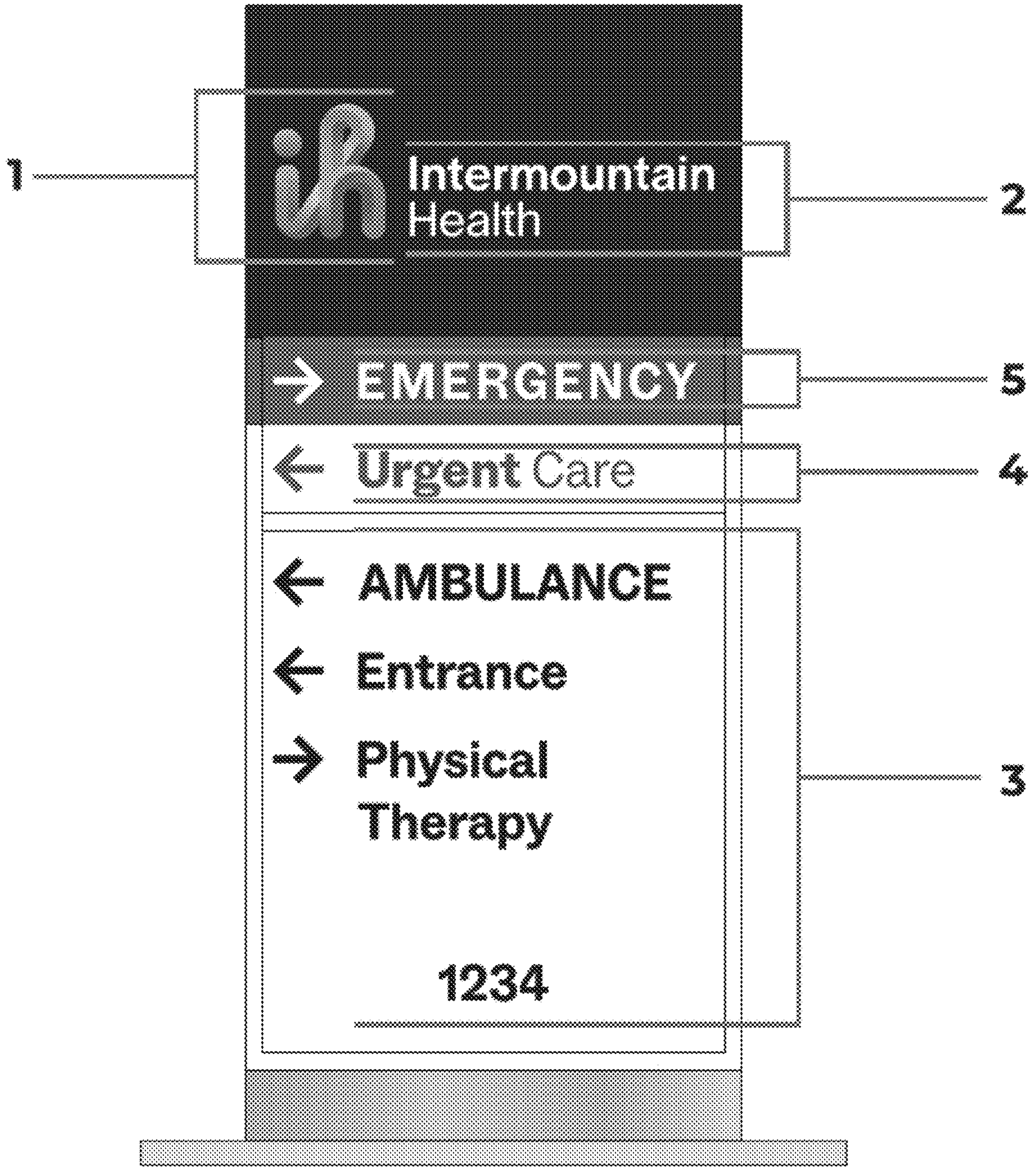
FIG. 23A shows signage with LED specifications determined using a method in accordance with this disclosure.

FIG. 23A shows signage with LED specifications determined using a method in accordance with this disclosure. The example shown is similar to that illustrated above in FIG. 20A, but may provide a different scenario. Accordingly, the example of FIG. 23A contains additional components, such as informative zones 3, 4, 5, in addition to the logo design zone 1 and the word mark zone 2 shown in FIG. 20A.

Further, the setup of the signage in FIG. 23A may be different. Accordingly, while the specifications in FIG. 20A may be for channel letter lighting, the specification in FIG. 23A may be for an exterior freestanding sign with signage on a surface of a pylon, rather than in channel letters.

Figure 23C:
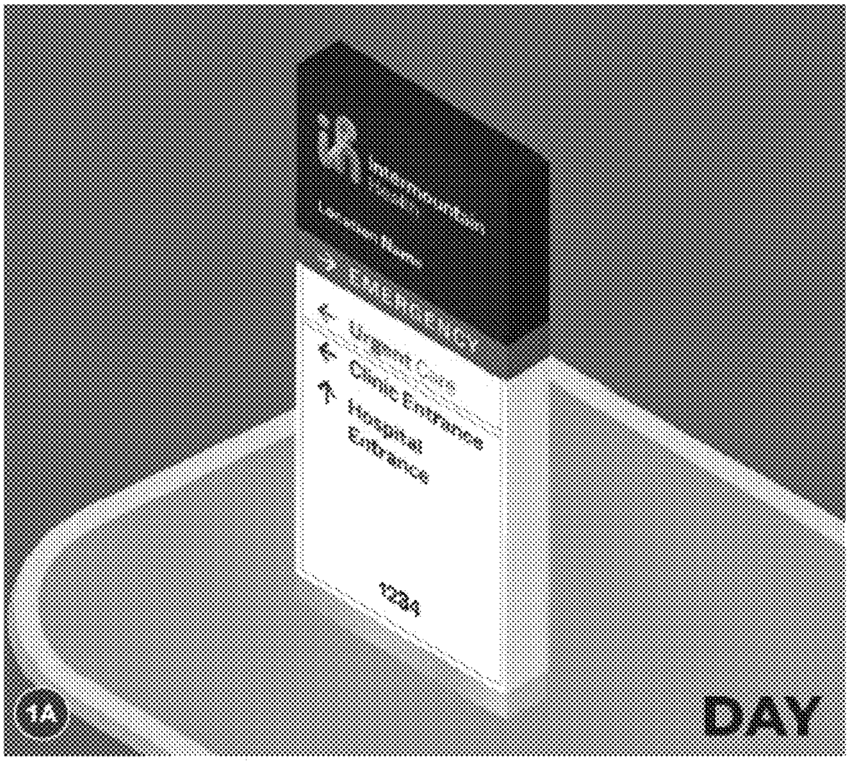
FIGS. 23C and 23D show the signage of FIG. 23A as viewed during the day and during the night respectively.
Figure 23D:
Figure 24A:
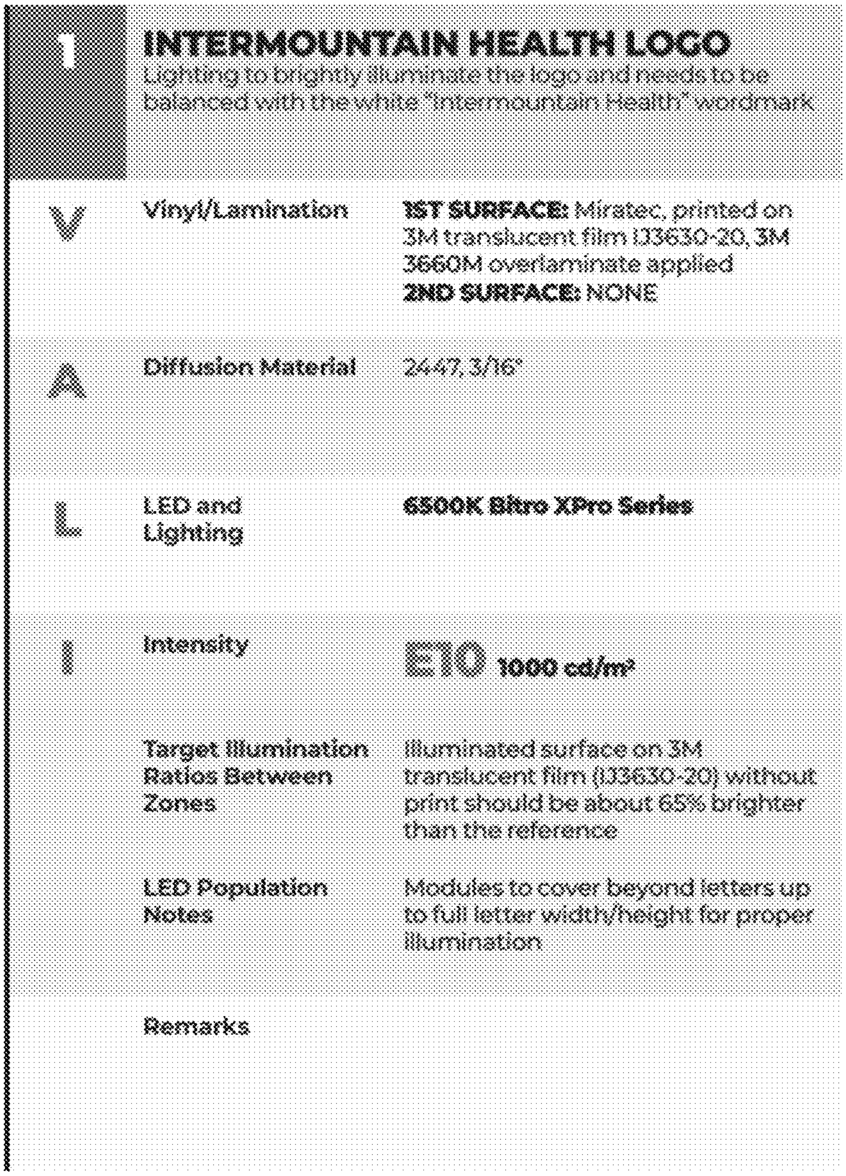
Figure 24B:

FIG. 23B shows LED identifiers associated with zones of the signage of FIG. 23A. FIGS. 23C and 23D show the signage of FIG. 23A as viewed during the day and during the night respectively.

Accordingly, while a user may want the same end result for the logo zone 1 and the word mark zone 2 in both daylight and night time scenarios as the end result achieved in the example of FIG. 20A, the LED identifiers provided for the corresponding zones may be different due to the different context. Accordingly, while the logo design may have the identifier ITS-IMH-IH02-X in the context of channel letter lighting, the logo design may instead have the identifier ITS-IMH-IH01-X in the context of pylon surface lighting to achieve the same result.

FIGS. 24A, 25A, 26A, 27A, and 28A show an actual configuration associated with each zone of the signage of FIG. 23A. As can be seen, the first two zones, corresponding to those of FIG. 20A, are provided with similar configurations, but with lower intensities. The remaining zones are provided with complete configurations as well.

FIGS. 24B, 25B, 26B, 27B, and 28B show LED chips corresponding to the actual configurations of FIGS. 24A, 25A, 26A, 27A, and 28A respectively and defining LED specification values and identifiers associated with the configurations. The same changes noted above distinguishing the context of FIG. 20A from that of 23A are reflected in the resulting LED specification values and identifiers associated with each zone.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An LED specification system comprising:
at least one LED light output device having:
an LED light source;
a first exchangeable face panel selectable from a plurality of potential exchangeable face panels; and
a housing for locating the first exchangeable face panel relative to the LED light source and for orienting the LED light source such that light from the LED light source passes through the first exchangeable face panel;
a user interface for selecting at least one preferred output characteristic for light from the LED light output device or for controlling an actual output of the LED light output device;
a transformation module for defining an LED specification value based at least partially on the user selected preferred output characteristic or an actual configuration of the LED light output device at a particular time.

2. The LED specification system of claim 1, wherein the LED specification value is further based on an identification of the first exchangeable face panel.

3. The LED specification system of claim 1 wherein the at least one preferred output characteristic is at least one of output luminance and color temperature.

4. The LED specification system of claim 1, wherein the LED specification value differs based on which of the plurality of potential exchangeable face panels is selected as the first exchangeable face panel.

5. The LED specification system of claim 4, wherein the first exchangeable face panel is a combination of two or more face panels from the plurality of potential exchangeable face panels.

6. The LED specification system of claim 5 wherein the first exchangeable face panel is a combination of an acrylic face panel and a vinyl face panel.

7. The LED specification system of claim 1, wherein the LED light source is selected from a plurality of potential LED light sources for incorporation into the LED light output device, and wherein the LED specification value differs based on which of the plurality of potential LED light sources is selected.

8. The LED specification system of claim 1 further comprising a retention element for compressing the first exchangeable face panel against the housing.

9. The LED specification system of claim 1, wherein the LED light output device further comprises a removable shade for extending from the housing perpendicular to the direction of the face panel.

10. The LED specification system of claim 1, wherein upon adjusting the at least one preferred output characteristic at the user interface based on an observed output of the LED light output device, the system outputs a corresponding LED specification value based on the actual configuration of the LED light output device.

11. The LED specification system of claim 1, wherein the transformation module further outputs a configuration file defining the LED specification value at the particular time.

12. The LED specification system of claim 11, wherein the LED specification value defines the first exchangeable face panel, the LED light source, and an output luminance of a particular configuration of the LED light output device.

13. The LED specification system of claim 1, wherein the transformation module further outputs a configuration file containing an identifier representing the LED specification value at the particular time, wherein the identifier does not encode the LED specification value.

14. An LED specification kit comprising:

a control unit having a user interface;

a transformation module;

a plurality of LED light sources;

a plurality of exchangeable face panels;

a housing for locating at least one of the exchangeable face panels relative to one of the plurality of LED light sources;

wherein the control unit identifies a LED specification kit configuration corresponding to a preferred output characteristic selected at the user interface for light from at least one of the plurality of LED light sources viewed through the at least one exchangeable face panel or allows a user to control an actual output of the housing of the LED specification kit;

and wherein the transformation module defines a first LED specification value based at least partially on the user selected preferred output characteristic or an actual configuration of the housing of the LED specification kit at a particular time.

15. The LED specification kit of claim 14, wherein the plurality of potential exchangeable face panels comprises a plurality of vinyl panels and a plurality of acrylic panels.

16. The LED specification kit of claim 14 further comprising a second housing for locating at least one of the exchangeable face panels relative to at least one of the plurality of LED light sources, wherein the transformation module defines a second LED specification value based at least partially on a user selected preferred output characteristic or an actual configuration of the second housing of the LED specification kit at a particular time;

wherein the second LED specification value is different from the first LED specification value.

17. The LED specification kit of claim 14 wherein the transformation module further outputs a configuration file defining the LED specification value at the particular time.

18. The LED specification kit of claim 14 wherein the transformation module further outputs a configuration file containing an identifier representing the LED specification value at the particular time, wherein the identifier does not encode the LED specification value.

19. A method for defining an LED configuration, the method comprising:

providing an LED light output device having an LED light source, a first face panel selectable from a plurality of potential exchangeable face panels, and a housing for locating the first face panel relative to the LED light source and for orienting the LED light source such that light from the LED light source passes through the first exchangeable face panel;

identifying an actual output of the LED light output device at a particular time;

defining, at a transformation module, an LED specification value based at least partially on an actual configuration of the LED light output device at the particular time.

20. The method of claim 19 further comprising outputting a configuration file containing an identifier representing the LED specification value at the particular time.

* * * * *